United States Patent
Black

(10) Patent No.: US 12,051,078 B2
(45) Date of Patent: Jul. 30, 2024

(54) ACCOUNT OWNER FUNDING OF KNOW YOUR CUSTOMER AND ACCREDITED INVESTOR VERIFICATION RENEWAL AND MONITORING CHARGES THROUGH COIN PAYMENT

(71) Applicant: tZERO IP, LLC, Salt Lake City, UT (US)

(72) Inventor: Tron Black, Sandy, UT (US)

(73) Assignee: tZERO IP, LLC, Salt Lake City, UT (US)

( * ) Notice: Subject to any disclaimer, the term of this patent is extended or adjusted under 35 U.S.C. 154(b) by 113 days.

(21) Appl. No.: 17/127,010

(22) Filed: Dec. 18, 2020

(65) Prior Publication Data

US 2021/0192541 A1 Jun. 24, 2021

Related U.S. Application Data

(60) Provisional application No. 63/090,820, filed on Oct. 13, 2020, provisional application No. 62/950,070, filed on Dec. 18, 2019.

(51) Int. Cl.
*G06Q 30/018* (2023.01)
*G06F 16/23* (2019.01)
(Continued)

(52) U.S. Cl.
CPC ..... *G06Q 30/0185* (2013.01); *G06F 16/2315* (2019.01); *G06Q 10/10* (2013.01);
(Continued)

(58) Field of Classification Search
CPC .................. G06Q 20/00–425; H04L 9/00–50
See application file for complete search history.

(56) References Cited

U.S. PATENT DOCUMENTS 10,333,705 B2 * 6/2019 Smith ................ G06Q 20/3276
10,333,706 B2 * 6/2019 Smith ................ H04L 63/0492
(Continued)

FOREIGN PATENT DOCUMENTS

KR 101936759 B1 1/2019
KR 20190120559 A 10/2019
(Continued)

OTHER PUBLICATIONS

Bitcoin, "In-Dev: End of usernames/passwords, ushering in blockchain-based access and TCA: Token Controlled Access", at least as early as Oct. 9, 2017, pp. 1 through 4, https://www.reddit.com/r/Bitcoin/comments/5ewdsu/indev_end_of_usernamepasswords_ushering_in/.
(Continued)

Primary Examiner — Ari Shahabi
(74) Attorney, Agent, or Firm — Fogg & Powers LLC

(57) ABSTRACT

A computerized method includes receiving payment of an amount of cryptocurrency from a transaction account to another account. The computerized method also includes, when the payment of the amount of cryptocurrency is received at the another account from the transaction account, causing at least one of KYC, AML, and accredited investor review to be performed for an owner of the account. The computerized method also includes, when the at least one of the KYC, AML, and accredited investor review causes a status of the owner of the account to change, at least one of adding or removing at least one indication of the owner's status to a distributed ledger.

18 Claims, 10 Drawing Sheets

(51) Int. Cl.
| | |
|---|---|
| *G06Q 10/10* | (2023.01) |
| *G06Q 20/06* | (2012.01) |
| *G06Q 20/36* | (2012.01) |
| *G06Q 20/38* | (2012.01) |
| *G06Q 20/40* | (2012.01) |
| *G06Q 40/04* | (2012.01) |
| *G06Q 50/26* | (2024.01) |
| *H04L 9/30* | (2006.01) |

(52) U.S. Cl.
CPC ..... *G06Q 20/0655* (2013.01); *G06Q 20/3674* (2013.01); *G06Q 20/3678* (2013.01); *G06Q 20/3829* (2013.01); *G06Q 20/389* (2013.01); *G06Q 20/401* (2013.01); *G06Q 40/04* (2013.01); *H04L 9/30* (2013.01); *G06Q 20/3825* (2013.01); *G06Q 50/26* (2013.01); *G06Q 2220/00* (2013.01); *H04L 2209/56* (2013.01)

(56) References Cited

U.S. PATENT DOCUMENTS

| | | | | |
|---|---|---|---|---|
| 10,361,849 | B2* | 7/2019 | Smith | G06Q 20/02 |
| 10,558,974 | B2* | 2/2020 | Smith | H04L 63/061 |
| 10,652,018 | B2* | 5/2020 | Smith | H04L 63/061 |
| 10,666,434 | B2* | 5/2020 | Smith | G06Q 20/308 |
| 2019/0114706 | A1* | 4/2019 | Bell | H04L 9/3239 |
| 2019/0303888 | A1 | 10/2019 | Hamasni et al. | |
| 2019/0318351 | A1* | 10/2019 | Ardashev | G06Q 20/389 |
| 2019/0370807 | A1* | 12/2019 | Hu | G06Q 20/10 |
| 2019/0370818 | A1* | 12/2019 | Cole | G06Q 30/018 |
| 2021/0027289 | A1* | 1/2021 | Guo | H04L 9/3247 |

FOREIGN PATENT DOCUMENTS

| | | | |
|---|---|---|---|
| WO | WO-2018060951 A1 * | 4/2018 | |
| WO | 2019175837 A1 | 9/2019 | |

OTHER PUBLICATIONS

Civic, "Civic Wallet—Frequently Asked Questions", Civic, at least as early as Oct. 9, 2020, pp. 1 through 4, https://www.civic.com/faq/.

U/MOBDOC, "I have a piece of software that I would like to share, but I'm wondering if it can be embedded with a code that asks the new user to send a fixed amount of bitcoin (e.g. $10) to an address.", Reddit, at least as early as Oct. 9, 2015, pp. 1 through 13, https://www.reddit.com/r/Bitcoin/comments/3nprn/i_have_a_piece_of_software_that_i_would_like_to/.

"BitActivate Code from Tron Black and Trent Larson", at least as early as Nov. 2, 2014, pp. 1 through 3, https://github.com/trentlarson/BitActivate/blob/master/ba/index.html.

International Searching Authority, "International Search Report and Written Opinion from PCT Application No. PCT/US2020/066024", from Foreign Counterpart to U.S. Appl. No. 17/127,010, filed Apr. 19, 2021, pp. 1 through 12, Published: WO.

European Patent Office, "Extended European Search Report", from EP Application No. 20902217.7, from Foreign Counterpart to U.S. Appl. No. 16/536,701, filed Nov. 14, 2023, pp. 1 through 9, Published: EP.

* cited by examiner

ACCOUNT OWNER FUNDING OF KNOW YOUR CUSTOMER AND ACCREDITED INVESTOR VERIFICATION RENEWAL AND MONITORING CHARGES THROUGH COIN PAYMENT

CROSS-REFERENCE TO RELATED APPLICATIONS

This application claims the benefit of U.S. Provisional Patent Application Ser. No. 62/950,070 filed on Dec. 18, 2019 and entitled "ACCOUNT OWNER FUNDING OF KNOW YOUR CUSTOMER AND ACCREDITED INVESTOR VERIFICATION RENEWAL AND MONITORING CHARGES THROUGH COIN PAYMENT"; and U.S. Provisional Patent Application Ser. No. 63/090,820 filed on Oct. 13, 2020 and entitled "ACCOUNT OWNER FUNDING OF KNOW YOUR CUSTOMER AND ACCREDITED INVESTOR VERIFICATION RENEWAL AND MONITORING CHARGES THROUGH COIN PAYMENT", the entireties of both of which are incorporated herein by reference.

SUMMARY

A computerized method includes receiving payment of an amount of cryptocurrency from a transaction account to another account. The computerized method also includes, when the payment of the amount of cryptocurrency is received at the another account from the transaction account, causing at least one of KYC, AML, and accredited investor review to be performed for an owner of the account. The computerized method also includes, when the at least one of the KYC, AML, and accredited investor review causes a status of the owner of the account to change, at least one of adding or removing at least one indication of the owner's status to a distributed ledger.

A computerized method includes monitoring for a renewal cryptocurrency payment from a customer's transaction address that is associated with a valid license for a digital asset, where the digital asset is associated with a digital asset identifier. The computerized method also includes, when a renewal cryptocurrency payment is received from the customer's transaction address, maintaining an indication on a distributed ledger indicating that the customer's transaction address is associated with the valid license. The computerized method also includes, when a renewal cryptocurrency payment is not received from the customer's transaction address, removing the indication from the distributed ledger when the license expires.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
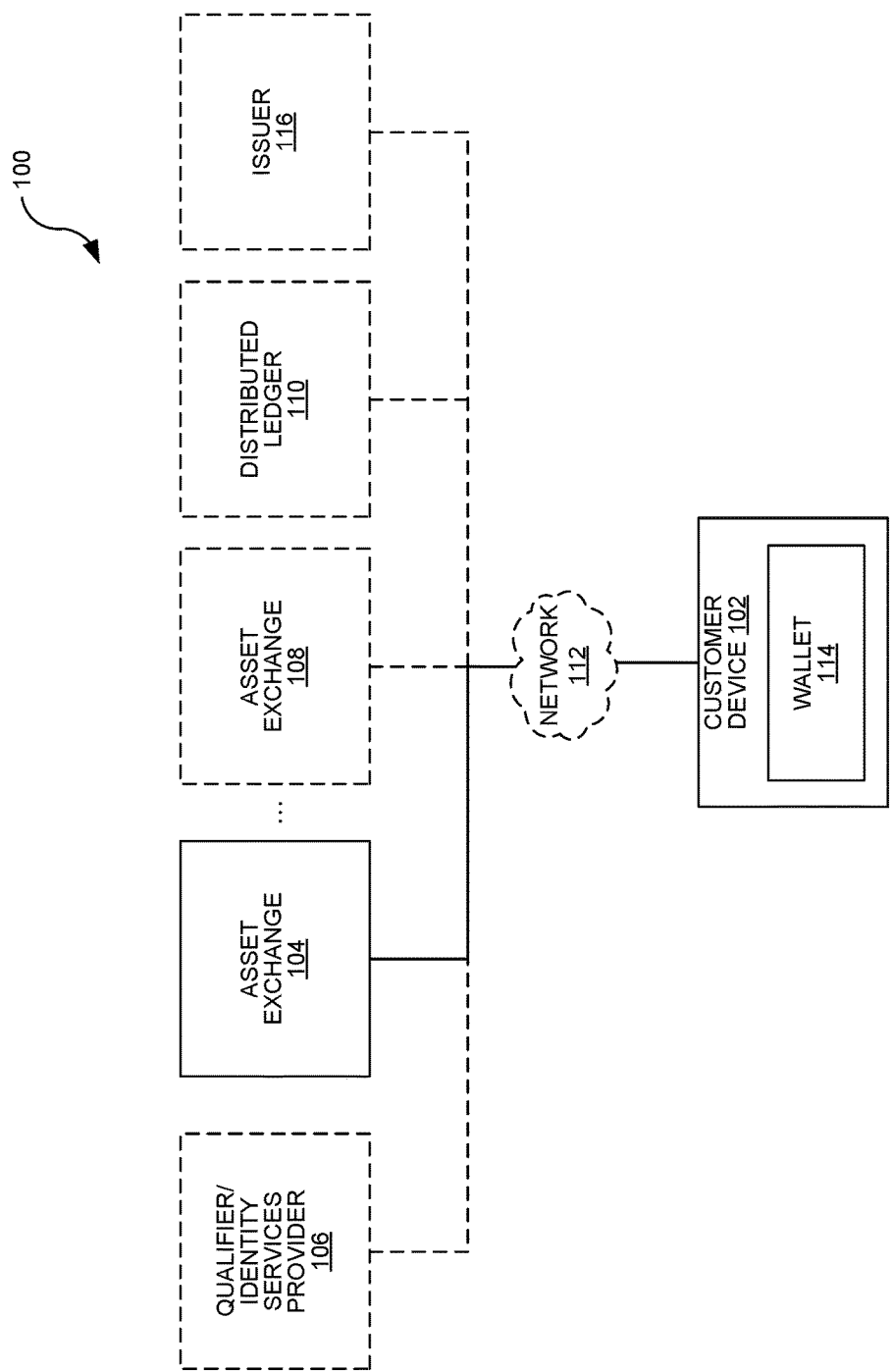
FIG. 1 is a block diagram of an example system according to the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Under regulations promulgated by the Securities and Exchange Commission (SEC), certain individuals may qualify to purchase cryptographic tokens. In examples, this could apply to an asset that is regulated under SEC Regulation D, Regulation S, and/or Regulation A. Under these Regulations, certain individuals can qualify to transact at different times if they qualify under various exemptions to the regulations. Under U.S. federal securities laws, a company that offers or sells its securities must register the securities with the SEC or find an exemption from the registration requirements. For some exemptions, such as Rule 406 of Regulation D, a company may sell securities to an individual referred to as an accredited investor, which is defined in Rule 501 of Regulation D. There are also other exceptions under other parts of Regulation D, Regulation S, Regulation A, etc. As used herein, Regulation A refers to any of Rules 251-263 of Regulation A (as found in 17 C.F.R. § 230.251-230.263); Regulation D refers to any of Rules 501-406 of Regulation D (as found in 17 C.F.R. § 230.501-230.406); and Regulation S refers to any of Rules 901-905 of Regulation S (as found in 17 C.F.R. § 230.901-230.905).

Recently, the SEC has determined that cryptographic tokens may be considered securities based on individual circumstances. Many initial coin offerings (ICOs) are restricted to users that are outside the United States and other territories with strict securities regulation in order to avoid application of securities laws. However, this restriction limits the pool of investors and/or users that may purchase tokens.

Security tokens can be used to aid in compliance with applicable securities regulations. In examples, security token accounts owned by individuals can be tagged based on compliance with SEC Regulation D, Regulation S, and/or Regulation A. In some examples, a tag can be used to identify whether specific security token accounts (or their owners) meet requirements for purchase of a regulated token (such as KYC, AML, accredited investor status). In examples, a tag can be used to identify whether the buyer qualifies as an accredited investors under Rule 501 of Regulation D.

One potential problem for security token transactions is the transfer of a security token to and/or from an investor that does not qualify under an exemption to the SEC regulations. Violations of SEC regulations can result in steep fines and/or criminal penalties. It is desirable to prevent security token transactions not complying with SEC regulations from being executed. Aside from possible fines and/or criminal penalties, an inadvertent violator of the SEC regulations may not be able to subsequently sell their security token(s) following a non-compliant purchase.

Know Your Customer, alternatively known as know your client or simply KYC, is the process of a business verifying the identity of its clients and assessing their suitability, along with the potential risks of illegal intentions towards the business relationship. The term is also used to refer to the bank regulations and anti-money laundering regulations which govern these activities. Know your customer processes are also employed by companies of all sizes for the purpose of ensuring their proposed customers, agents, consultants, or distributors are anti-bribery compliant. Banks, insurers, export creditors and other financial institutions are increasingly demanding that customers provide detailed due diligence information.

Anti-money laundering and/or know-your-customer (AML/KYC) screening(s) may be performed by one or more computing devices that provide AML/KYC services (also called identity service providers). AML services may include one or more steps to ensure that a potential (or current) customer is not in violation of relevant laws and regulations designed to combat money laundering, i.e., AML services seek to ensure that a potential (or current) customer is not taking steps to obscure the source of funds that were received from illegal or unethical activities. KYC services may include one or more steps to gather, review, and monitor information related to the identity and/or financial dealings of a potential (or current) customer. In examples, KYC services may include collecting basic identity data (e.g., name, contact information, etc.), verifying that the customer is who they say they are, and/or ensuring that the customer is not on any law enforcement watch lists. KYC services may also include performing a soft credit check (e.g., based on the customer's basic identity data), analyzing a customer's transactional behavior, and/or monitoring the customer's account for fraudulent behavior based on the customer's transaction behavior. AML/KYC may be required under various federal, state, and/or local laws, including SEC regulations.

In the existing financial system, there are retail broker dealers with customers where the retail broker dealers are responsible under the Bank Secrecy Act (BSA) and Patriot Act to do Know Your Customer (KYC) initial screenings and ongoing KYC screenings on their customers. This is possible because of the centralized nature of stock brokerages. The lifetime value of most customers provides sufficient funding to justify the continued and on-going KYC monitoring.

In decentralized ecosystems, it is necessary for the issuer of a security to perform the same KYC screenings and the funds raised by the offering will likely cover the KYC, but not necessarily the required ongoing monitoring. In order to develop a decentralized ecosystem, the individual user may need to bear some of the cost for remaining KYCed which lowers the burden on the issuer and exchanges. With the ability to sign and prove ownership of an address, an issuer or exchange could know that sufficient verification and/or renewed scanning has been performed in the last six months by an entity that has policies in place.

The examples described herein implement tagging into a blockchain for KYC, AML, and/or accreditation investor screening and automated self-funding of KYC, AML, and/or accredited investor screening renewal and monitoring by token holders. For example, the solution for having a decentralized KYC is built into the tagging system of Ravencoin. If an entity (referred to as a "qualifier" herein) with a high enough bar for KYC/AML/Office of Foreign Assets Control (OFAC) screening tags an address of an individual (such as with a tag KYC.Qualifier.L1 for a Level 1 KYC tag from a particular qualifier), then there is cryptographic proof that the entity has the supporting records and documentation about the individual. The tags can then be used in logical rules that only allow accounts having certain tags to transact in different ways with different security tokens (or otherwise restricted tokens). For example, a logic rule for a particular security token may require that KYC.Qualifier.L1 tag be applied to an account before that account can buy or otherwise transact in a particular security token.

In the existing National Market System (NMS) the retail broker dealers like Charles Schwab, Fidelity, etc. cover this cost and re-screen their customers. This permanence of customer does not exist in the security token space as the token holder can shop around. But the cryptographic address on a distributed ledger does have a permanence.

In examples, the initial KYC, AML, and/or accreditation investor screening could be paid for by a security token issuer, as is currently done. After initial screening and issuance, the incentive to re-screen goes away for the initial issuer, but there is an incentive for the address owner to maintain live tag(s), such as #KYC. This ongoing screening currently costs less than US $1.00 per screening event (which for most people is only required once every six months, though for some individuals it may be required more often, such as once every 3 months or once every month). Therefore, the present systems and methods allow the address holder to pay for the ongoing KYC, AML, and/or accreditation investor screening in order to stay part of a legally-compliant ecosystem of token holders, which enables them to buy or sell restricted security tokens. The screenings (initial or renewal) can be paid for using cryptocurrency, e.g., using Ravencoin (RVN) as the payment mechanism. Using the cryptography of a blockchain is a technical improvement over conventional methods of renewal KYC, AML, and/or accreditation investor. Since both the initial payment and renewal cryptocurrency transaction would be signed by the same private key, the system cryptographically ensures that the same individual (who was originally screened) still controls the address that is tagged or whitelisted as having passed the screening. In other words, the present systems and methods enable a KYC platform to ensure that they are renewing the tag or whitelist indication for the same person who was previously screened by the issuer.

In a specific example, a KYC platform would fully automate the renewal screening process so that a payment request would be sent through e-mail, blockchain-based memos, or other channel to indicate that a payment for renewal screening is needed to remain KYCed or Accredited. The payment would be made via cryptocurrency (e.g., Ravencoin (RVN)), and the renewal KYC screening would be done. In the absence of payment from the previously-tagged address, the #KYC tag would be removed. This allows the holders of compliant tokens to still send them, but not to receive more restricted assets (tokens that require #KYC and/or #ACCREDITED tag). The send-to/destination address or the send-from/source address (if #KYC tagged) could be used as identification of user to be re-scanned.

In examples, a qualifier (a person or entity that is given ability to qualify individuals based on KYC, AML, accredited investor, etc.) collects identity data from individuals and compares it against databases for KYC, AML, and/or requirements for accredited investor status and then can apply a tag to the account/address in a blockchain associated with the qualified individual. The tag is an attribute of the blockchain. Qualifiers can also revoke tags, such as during a subsequent KYC, AML, and/or accreditor investor screening where the tag should be removed because of lack of compliance. The current state of the tags associated with the account/address in the blockchain are updated when a tag is added or revoked/removed. While most people pass the KYC/AML database checks, some people may fail and have various tags added or revoked/removed based on the failure.

Most individuals only need follow-up screening of KYC, AML every 6 months in the US based on regulations, but some individuals may need to do it more often, such as every 3 months or ever month. The riskier an individual is based on what lists they may be on, the more often additional follow-up compliance screening is needed.

As the issuers no longer have an incentive to pay for the follow-up screening after their initial sale, this description describes the ability of allowing the individual account holders to easily pay for the follow-up screening. In examples, the qualifier (screening company) will contact the owner of the account and ask them if they want to have the follow-up screening for a certain fee. The owner of the account (who has access to the private key) can then transfer some of the underlying blockchain coin (such as Ravencoin) from the address that has the tag that needs to have follow-up screening to the qualifier (screening company) to authorize the follow-up screening. In examples, the address maintains the tag only when the payment (for follow-up screening) is received from the address and the follow-up screening is successful (the owner passes the screening). In examples, there is a small transaction fee charged as part of the transaction of the fee for follow-up screening.

This ability to enable individual account holders to pay for follow-up screening can be implemented in any of the systems, apparatuses, and/or methods described below.

FIG. 1 is a block diagram of an example system 100 for implementing transactions with regulated tokens, e.g., security tokens. The system 100 includes a customer device 102, asset exchange 104, an optional qualifier/identity services provider 106, an optional second asset exchange 108, an optional distributed ledger 110, and/or one or more optional issuers 116. Additionally, the system 100 may include more than one of each device. In examples, the system 100 may be used for (1) account-owner-funded KYC, AML, and/or other accredited investor screening; and/or (2) renewing a license for a digital asset.

Each of the customer device 102, the asset exchanges 104, 108, the qualifier/identity services provider 106, and/or the issuer 116 may be implemented as any of a mobile computing system, such as a mobile phone, tablet computer, mobile media device, mobile gaming device, laptop computer, or vehicle-based computer, etc.; or a non-mobile computing device such as a dedicated terminal, public terminal, a kiosk, a server, a cloud server, or a desktop computer.

In some examples, each of the customer device 102, the asset exchange 104, the qualifier/identity services provider 106, and/or the issuer 116 may include at least one memory, at least one processor, at least one optional network interface, at least one optional display device, at least one optional input device, and at least one optional power source. Additionally, any of the customer device 102, the asset exchanges 104, 108, the qualifier/identity services provider 106, and/or the issuer 116 may be implemented as a system of devices.

As used herein, unless otherwise specified, the term "customer" (or "user") refers to a person (or automated instructions, e.g., a script) that accesses the customer device 102 to initiate any of the functionality described herein, e.g., sending an intent to purchase the token, executing etc.

As used herein, the term "issuer" refers to a person or entity (or computing device(s) used by the person or entity) that initiates the issuance of security tokens, e.g., using one or more originating smart contracts that deploy/issue security tokens. The system 100 may include up to many issuers 116. In examples, the issuer 116 may be a company and each security token issued represents a share of the company.

As previously described, the terms "qualifier" and "identity services provider" refers to a person or entity (or computing device(s) used by the person or entity) that is given ability to qualify individuals based on KYC, AML, and/or accreditation laws and regulations. In examples, the qualifier 106 collects identity data from individuals (or an issuer 116 for initial screening) and performs KYC, AML, and/or other accredited investor screening using the collected identity data. In examples, the screening may include comparing any of the user's identity data to database(s) maintained by various law enforcement and/or other government agencies. In examples, the qualifier 106 performs this screening (1) initially (e.g., at the request of and paid for by the issuer 116) to apply the tags to the user's address (or add the user's address to a whitelist); and/or (2) to renew the tag in the user's address (or maintain the user's address in the whitelist).

In some examples, the qualifier 106 may indicate whether or not the user has passed the KYC, AML, and/or other accredited investor screening by applying or removing a tag to the user's address in the distributed ledger 110, e.g., by recording a tagging transaction into the user's address on the distributed ledger 110, such as a Ravencoin blockchain. Alternatively or additionally, the qualifier 106 can indicate whether or not the user has passed KYC, AML, and/or other accredited investor screening by adding or removing a user's address in a whitelist stored on a token smart contract, e.g., on an Ethereum blockchain.

As used herein, the term "wallet" refers to a software program, digital file, and/or memory used to store and/or manage digital assets, such as cryptocurrency. Although the present systems and methods are described herein using cryptocurrency, they are also compatible with any type of digital asset. In some examples, a wallet 114 may be defined by one or more private keys, one or more public keys derived from one or more private keys, and/or one or more transaction addresses derived from one or more private keys and/or one or more public keys. In some examples, a wallet 114 may be defined by one or more private account keys (and optional corresponding public account key(s)), each of which may have one or more child and/or grandchild transaction keys.

Encryption may be used in the present systems and methods. In some configurations, asymmetric encryption may be used. A "public/private keypair," which includes a private key and a corresponding public key, may be used in asymmetric encryption. The private key and public key may alternatively be referred to as an decrypting private key and an encrypting public key, respectively. This may be referred to as "asymmetric" encryption/decryption because the same key is not used to encrypt and decrypt (or sign transactions). It is generally desirable to keep a private key (and sometimes the public key) secure. Without limitation, asymmetric keys may operate according to any of the following encryption: Rivest-Shamir-Adleman (RSA) and Elliptic Curve Cryptography (ECC) (e.g., Curve25519), Edwards-curve Digital Signature Algorithm (EdDSA) (e.g., Ed25519), etc. In examples, a public key can be used to encrypt data, which can then be decrypted only using the private key corresponding to the public key that was used for encryption.

As used herein, the term "signing," or its variants, refers to adding or modifying data associated with a desired transaction using a private key. In addition to encryption/decryption, a public key may be used to generate a transaction address (e.g., in a customer wallet) on a distributed ledger, and only the corresponding private key can sign a transaction that spends funds from the transaction address. For example, a customer device 102 can sign a cryptocurrency transaction (e.g., transferring token(s) from a first address to a second address) using a private key, and a node implementing the distributed ledger can verify the signature using the corresponding public key before recording the signed transaction on the distributed ledger. In this way, multiple different transactions using a private key can be attributed to the same holder of the private key since only a single public key can verify all signatures made with the corresponding private key.

As used herein, the term "distributed ledger" refers to an electronic ledger that is distributed across multiple interconnected nodes, where more than one of the nodes stores a copy of the ledger. The ledger is organized in part using a number of addresses or transaction addresses, which can serve as a source or destination for transactions on the ledger. Therefore, it is understood that, unless otherwise indicated, the terms "address" and "transaction address" are used interchangeably to refer to an identifier on a distributed ledger, e.g., a digital location on the distributed ledger. It is also understood that where reference is made to recording a transaction on the distributed ledger 110 or sending something to the distributed ledger 110, it may include communicating with a peer-to-peer node that stores a copy of the distributed ledger 110.

In some examples, the distributed ledger 110 may implement one or more blockchains to validate the data stored within the distributed ledger 110. A blockchain is a verifiable permanent ledger constructed one block at a time with a proof-of-work seal (such as a hash) affixed to each block that validates that block. In a blockchain, the hash of the previous block is included in the current block, and therefore by recursion the current hash also validates all previous blocks back to the original genesis block. Inserting a hash into a blockchain permanently records that hash and acts as a notary verifying the time stamped proof-of-existence of the hashed data at the moment in time that block is added to the chain. Any future blocks add a layer of protection from manipulation of the data stored in the chain or a chain re-organization and therefore provide additional certainty that no changes can be made to blocks earlier in the chain. A blockchain is an implementation of a distributed ledger 110. Exemplary blockchains include, but are not limited to, the bitcoin blockchain, the Ethereum blockchain, BigchainDB, Billon, Chain, Corda, Credits, Elements, Monax, Fabric, HydraChain, Hyperledger, Multichain, Openchain, Quorum, Sawtooth, and Stellar.

In some examples, the customer device 102 may be a mobile device, e.g., using the Android® or iOS® operating systems. A customer may download, to the customer device 102, an application corresponding to the asset exchange 104. The application may present a user interface on the customer device 102, and the customer may provide input using the user interface. Based at least in part on the user input, the application on the customer device 102 may send and receive instructions and/or other data to the asset exchange 104. In some examples, the application on the customer device 102 may only communicate directly with the asset exchange 104, which communicates with other devices in the system 100, i.e., the asset exchange 104 may be a gateway to other devices in the system 100. Alternatively, the application on the customer device 102 may communicate directly with the asset exchange 104 and/or other devices in the system 100, such as the qualifier 106 or a node implementing the distributed ledger 110.

In some examples, the asset exchange 104 may assist end-users (i.e., customers) in purchasing and/or exchanging tokens (e.g., self-regulating and/or restricted tokens). In some examples, a token represents at least one of a security, a currency (e.g., a fiat currency or cryptocurrency), a commodity, a bond, a fund, or a combination thereof. In some examples, tokens represent other types of assets such as at least one piece of real property or personal property. Additionally, the asset exchange 104 enables customers to purchase self-regulating tokens using other forms of currency, e.g., fiat currency, cryptocurrency (e.g., Bitcoin or Ethereum), etc. In some examples, the asset exchange 104 may also enable customers to transact using self-regulating tokens, i.e., buy and/or sell goods and/or services in exchange for the tokens. In order to enable the purchase of cryptocurrency and transactions using cryptocurrency, the asset exchange may be a marketplace (and/or a business entity that operates the marketplace) in which securities, commodities, derivatives and/or other financial instruments are traded, e.g., Kraken, SFOX, Coinbase®, etc. In some examples, the asset exchange 104 may serve as a marketplace for cryptocurrency, digital currency, fiat currency, and/or commodity currency. In some examples, the asset exchange 104 described herein may record successfully executed transactions on a distributed ledger 110, e.g., a blockchain. Alternatively, or in addition to, the asset exchange 104 may be configured to trade at least one security, at least one bond, at least one commodity, at least one piece of real property, at least one item of personal property, at least one fund, at least one currency fund, at least one exchange traded fund, at least one mutual fund, at least one index fund, at least one bond fund, at least one commodity fund, or at least one real estate fund. The asset exchange 104 may be implemented using one or more computing devices.

Each of the devices in the system 100 may be communicatively coupled to one or more other devices using at least one network 112. In some examples, the at least one network 112 includes at least one wired network and/or at least one wireless network. In some examples, any combination of wired and wireless networks may be used to couple the customer device 102 and the asset exchange 104 to each other. In some examples, the at least one network 112 includes at least one of at least one local area network (LAN), at least one wide area network (WAN), or the Internet. In some examples, any combination of local area networks, wide area networks, or the Internet may be used as the at least one network 112 to couple the customer device 102 and the asset exchange 104 to each other.

Figure 2:
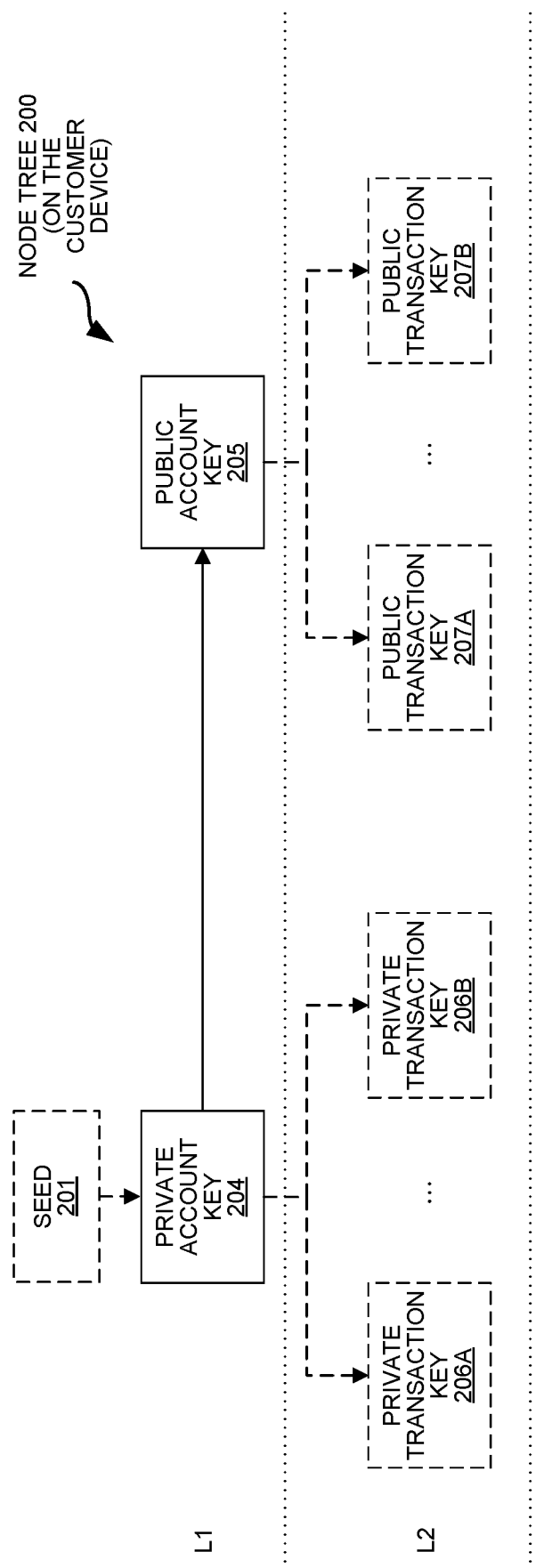
FIG. 2 is a block diagram illustrating an example node tree on a customer device for implementing a token transaction according to the present disclosure.

FIG. 2 is a block diagram illustrating an example node tree 200 on the customer device 102 for implementing a customer wallet 114 used for a token transaction. In some examples, the node tree 200 may implement a hierarchical deterministic (HD) wallet 114 for a customer according to portions of Bitcoin Improvement Proposal 32 (BIP32) and/or portions of Bitcoin Improvement Proposal 44 (BIP44). BIP32 (available at https://github.com/bitcoin/bips/blob/master/bip-0032.mediawiki) and BIP44 (available at https://github.com/bitcoin/bips/blob/master/bip-0044.mediawiki) are incorporated by reference herein.

The node tree 200 may reside on the customer device 102 and may include a hierarchy of levels. Specifically, the node tree 200 may include a private account key 204 and a public account key 205 in the first level (L1). The private account key 204 may be a unique string of numbers, letters, and/or other characters that is specific to a customer. The private account key 204 may further be specific to a type of cryptocurrency. For example, the customer device 102 may include a different private account key 204 for each type of cryptocurrency stored in a customer wallet 114. In some examples, the customer device 102 may store a separate private account key 204 for each of Bitcoin, Ethereum, Litecoin, etc. A customer wallet 114 may be defined by the private account key 204 and/or other private account key(s) (not shown).

Optionally, the private account key 204 may be generated at the customer device 102 based on a seed 201, e.g., a seed that is derived from a mnemonic code or sentence according to Bitcoin Improvement Proposal 39 (BIP39) (available at https://github.com/bitcoin/bips/blob/master/bip-0039.mediawiki and incorporated by reference herein). Alternatively, the private account key 204 may be generated at the customer device 102 randomly, manually, or by other means.

The private account key 204 may be used to derive a public account key 205, i.e., the private account key 204 may be determinative of the public account key 205. In some examples, the customer device 102 may use a hash function to derive the public account key 205 from the private account key 204, e.g., the SHA256 function. However, the public account key 205 is typically (and preferably) not determinative of the private account key 204, e.g., the public account key 205 may not be used to generate the private account key 204.

The private account key 204 and the public account key 205 may be "extended" keys, meaning that a chain code is appended to the key string. In some examples, each of the private account key 204 and the public account key 205 may be 256 bits long with an additional 256-bit chain code, i.e., the extended private account key 204 and the extended public account key 205 may each be 412 bits long. An extended key may be used to derive child keys, while a non-extended (or "hardened") key may not be used to derive child keys. Since they are extended keys, it may be preferable to avoid transmitting the private account key 204 and the public account key 205 from the customer device 102 to the asset exchange 104.

The private account key 204 may have one or more optional child private transaction keys 206A-B in the second level (L2) of the node tree 200. The private transaction key(s) 206 may be derived from the private account key 204 using a child key derivation (CKD) function, e.g., as described in BIP32. The private transaction key(s) 206 may be non-extended (i.e., hardened) keys and may not be used to derive further child keys. Without limitation, a transaction address (not shown in FIG. 2) may be derived from a private transaction key 206 or a public transaction key 207, e.g., a transaction address may be a hash of a public transaction key 207.

Each private transaction key 206 may have an associated index, e.g., in the range of 0 to $(2^{32}-1)$. The index may be used to navigate the node tree 200, i.e., an index may uniquely identify the location of its corresponding particular private transaction key 206. Accordingly, indices may be transmitted between devices as an efficient way to identify a private transaction key 206. In some examples, a device that receives an index may generate a corresponding private transaction key 206 from its own node tree.

Similarly, the public account key 205 may have one or more optional public transaction keys 207A-B in the second level (L2) of the node tree 200. Each public transaction key 207 may be derived from a public account key 205 using a child key derivation (CKD) function (e.g., as described in BIP32) or derived from an associated private transaction key 206, i.e., public transaction key 207A may be derived from private transaction key 206A and public transaction key 207B may be derived from private transaction key 206B. The public transaction key(s) 207 may be non-extended (i.e., hardened) keys and may not be used to derive further child keys.

Each public transaction key 207 may have an associated index, e.g., in the range of 0 to $(2^{32}-1)$. The index may be used to navigate the node tree 200, i.e., an index may uniquely identify the location of its corresponding particular public transaction key 207. Accordingly, indices may be transmitted between devices as an efficient way to identify a public transaction key 207. In some examples, a device that receives an index may generate a corresponding public transaction key 207 from its own node tree.

In some examples, the node tree 200 may include many (e.g., hundreds, thousands, millions or billions) private transaction keys 206, e.g., a new private transaction key 206 may be generated for every transaction in which cryptocurrency is received into the customer wallet 114 and/or every transaction in which less than all cryptocurrency in an existing transaction address is transferred. Additionally, the node tree 200 may include many (e.g., hundreds, thousands, millions or billions) public transaction keys 207, e.g., one corresponding to each private transaction key 206 in the node tree 200.

While illustrated with two hierarchical levels (L1-L2), the node tree 200 may include more hierarchical levels. In some examples, a change key level (not shown) may be positioned in between L1 and L2.

As discussed above, in order to comply with rules to avoid registration requirements for offering or selling tokens, a whitelisting functionality can be incorporated into the token contract (instead of or in addition to applying and removing tags from address on the distributed ledger 110). In order to be considered for the initial regulated token sale or offering, a potential purchaser (customer) of the token may undergo a whitelisting process to ensure that they satisfy certain requirements for the purchase. For example, the whitelisting process may be implemented for token sales complying with Regulation D, which requires that the potential purchaser qualify as an accredited investor as defined in Rule 501 of Regulation D. The issuer 116 of the token or qualifier 106 may then verify that the customer satisfies the criteria for purchasing a regulated token and then a public key or transaction address provided by the customer is added to the whitelist. In some examples, the whitelist is implemented on a smart contract that is different than the token contract. In such examples, the token contract includes a function call to the different smart contract implementing the whitelist. In some examples, the token contract includes a function call to multiple smart contracts implementing different whitelists, where each different whitelist verifies that the customers satisfy criteria for different regulations. For example, one whitelist may implement compliance with Regulation D while another whitelist may implement compliance with Regulation S or Regulation A.

Smart-contract-based compliance rules may ensure that any transaction involving the security token complies with the relevant SEC regulations. In examples, the smart-contract-based compliance rules may (1) verify that the buyer and/or the seller of the security token qualify under at least one of SEC Regulations A, D, and S; (2) verify that AML and/or KYC services have been performed for the buyer and/or seller; (3) verify that no freezes have been placed that would prevent the security token from being transferred; and/or (4) verify that the particular security token is not in a blackout period, i.e., a restriction that prevents the seller from selling the security token for a certain period of time (e.g., one year) following acquisition of the security token. Verifying whether the security token is in a blackout period may include traversing previous security token transactions in the distributed ledger 110 to find the acquisition date that the seller acquired the security token, and comparing the acquisition date to the current date (e.g., by accessing a server's date) to determine the length of time that the seller has held the security token. If the length of time (that the seller has held the security token) equals or exceeds an applicable blackout period, the security token is not in the blackout period.

In examples, there may be a separate smart-contract-based compliance rule for every investor that directly indicates whether the investor qualifies under SEC Regulation A, D, or S; whether AML/KYC has been performed; whether the particular security token is in a blackout period; and/or whether a freeze has been placed on the investor. In this configuration, the compliance rules may be updated when information relevant to SEC Regulations changes (instead of, or in addition to, changing the investor element(s)).

In some examples, a potential customer provides identity data to the issuer 116 of the token or other entity in order to be considered for the whitelist. Identity data may include a customer's name, date of birth, driver's license number and expiration date, address, phone number(s), email address(es), social security number, employment information, and/or income. In some examples, the customer also provides payment data to the issuer 116, qualifier 106, or other entity in order to be considered for the whitelist. Payment data may include bank account information, credit card information, contactless payment data (e.g., Apple Pay® or Android Pay® username and passwords), existing cryptocurrency wallet 114 key, and/or other payment processing information (e.g., username and password for PayPal® or WhatsApp®). The customer device 102 may transmit the identity data and the payment data associated with the customer to the issuer 116 of the token or other entity using a secure transfer protocol, for example.

As part of the whitelisting process, or as a separate process, the issuer 116 of the token may transmit the identity data to the qualifier 106. The qualifier 106 may be one or more computing devices that provide know-your-customer (KYC) and/or anti-money laundering (AML) services. As mentioned above, AML services may include one or more steps to ensure that a potential (or current) customer is not in violation of relevant laws and regulations designed to combat money laundering, i.e., AML services seek to ensure that a potential (or current) customer is not taking steps to obscure the source of funds that were received from illegal or unethical activities. As mentioned above, KYC services may include one or more steps to gather, review, and monitor information related to the identity and/or financial dealings of a potential (or current) customer. In some examples, KYC services may include collecting basic identity data (e.g., name, contact information, etc.), verifying that the customer is who they say they are, and/or ensuring that the customer is not on any law enforcement watch lists. KYC services may also include performing a soft credit check (e.g., based on the customer's basic identity data), analyzing a customer's transactional behavior, and/or monitoring the customer's account for fraudulent behavior based on the customer's transaction behavior. AML and KYC may be required under various federal, state, and/or local laws.

When the AML and/or KYC procedures are complete, the qualifier 106 may transmit a notification to the issuer 116 of the security token (for initial screening) or the customer device 102 (for renewal screening). The notification may indicate the success or failure of the AML and/or KYC procedures for the customer. In some examples, the qualifier 106 may transmit a report indicating all AML and KYC screenings that it performed.

When the notification indicates that all (or all necessary) AML and KYC screenings were not passed, the issuer 116 or qualifier 106 of the token may notify the customer (for example, via an application) that the AML and/or KYC failed. Alternatively, when the notification indicates that the AML and/or KYC could not be completed with the identity data, the issuer 116 of the token may request additional information from the customer.

When the notification indicates that all (or all required) AML and KYC screenings passed and all the criteria for the regulated token sale are met by the customer, the customer's transaction address (provided by the customer from the customer device 102) may be added to at least one whitelist. Additionally or alternatively, when an individual is whitelisted for AML, KYC, and/or as an accredited investor, a tag can be applied to the particular user's address in the blockchain to show that they have been whitelisted as having passed AML, KYC, and/or accredited investor screening.

Since the token is a tradeable asset, the initial purchaser of the token may desire to sell or exchange the token with a subsequent purchaser. As discussed above, a problem can arise when a subsequent purchaser of a regulated token with whitelisting functionality tries to withdraw the token. In particular, the withdrawal of the regulated token may be restricted to certain public keys or transaction addresses included in a smart contract implementing the whitelist. If the subsequent purchaser's public key or transaction address is not tagged and/or listed on the necessary whitelist(s), then the subsequent purchaser will not be able to withdraw the token, e.g., for fiat currency, cryptocurrency, services, etc.

In some examples, the whitelist and/or tagging implements compliance with a single regulation or multiple regulations simultaneously. For example, the whitelist can include target transaction addresses associated with customers that comply with Regulation A, Regulation D, or Regulation S. For Regulation D compliance, the whitelist includes a list of accredited investors as defined in Rule 501 of Regulation D of the SEC regulations (see https://www.ecfr.gov/cgi-bin/retrieveECFR?gp=&SID=8edfd12967d69c024484029d968ee737&r=SECTION&n=17y3.0.1.1.12.0.46.176), which is incorporated by reference.

The whitelist(s) can be updated periodically to ensure that the customers associated with the public keys or transaction addresses comply with the particular rules for the whitelist. The whitelist(s) can be modified over time based on a number of factors. For example, the status of an individual or entity that qualifies as an "accredited investor" may change over time based on the value of assets owned, net worth, or income level of individual or entity. Another example is where a particular regulation that the whitelist is intended to implement has time-based restrictions. For example, Regulation S limits the sale of certain securities during the first 40 days following the commencement of an offer, so after the first 40 days, additional addresses may be whitelisted that were previously ineligible due to the location of the purchaser/seller. Accordingly, in some examples, the whitelist is modified or implemented using an oracle or other entity that operates as a data feed for providing verified information to the smart contract for the token.

In some examples, a failure message is sent to the parties to the transaction, the issuer 116, and/or the asset exchange 108. The message can identify which requirement was the point of failure for the transaction. For example, when the customer's transaction address or public key is not whitelisted, the message can notify the customer that the target transaction address and the target public key associated with the target transaction address are not on the appropriate whitelist. In such examples, the message may also include directions regarding how to be added to the required whitelist. When the transaction address or the public key is not associated with the private key, the message can notify the customer that the target transaction address and the target public key associated with the target transaction address are not associated with the private key.

In some examples, the purchase of the token is optionally recorded into the target transaction address on a ledger 110. In some examples, the ledger is an Ethereum blockchain. In some examples, the ledger can be another distributed ledger or blockchain.

While the particular examples described above are discussed in the context of whitelisting for complying with securities regulations, it should be understood that the systems and methods described herein are also applicable to other scenarios where whitelisting is used for token contracts. For example, when the issuer 116 of the tokens can limit the offering to a small group or implement commands for compliance with any suitable rule of their choosing. If the token contract implements this whitelisting functionality and is "self-regulating", the systems and methods discussed herein can be used in a similar manner to protect potential subsequent purchasers from transacting for a token they cannot withdraw.

In addition to implementing commands that restrict the transaction addresses or public keys for potential purchasers (e.g., only those on a whitelist), it also may be desirable for the issuer 116 of the token to restrict the exchanges where the token can be traded/transferred. In particular, if the token is traded on an exchange that does not require compliance with the whitelisting functionality, the above problems for subsequent purchasers may still be experienced.

The customer device 102 and other devices discussed above include or function with software programs, firmware or other computer readable instructions for carrying out various methods, process tasks, calculations, and control functions, used in the verification that transaction addresses are tagged or whitelisted prior to allowing a transfer of a restricted token.

Figure 3:
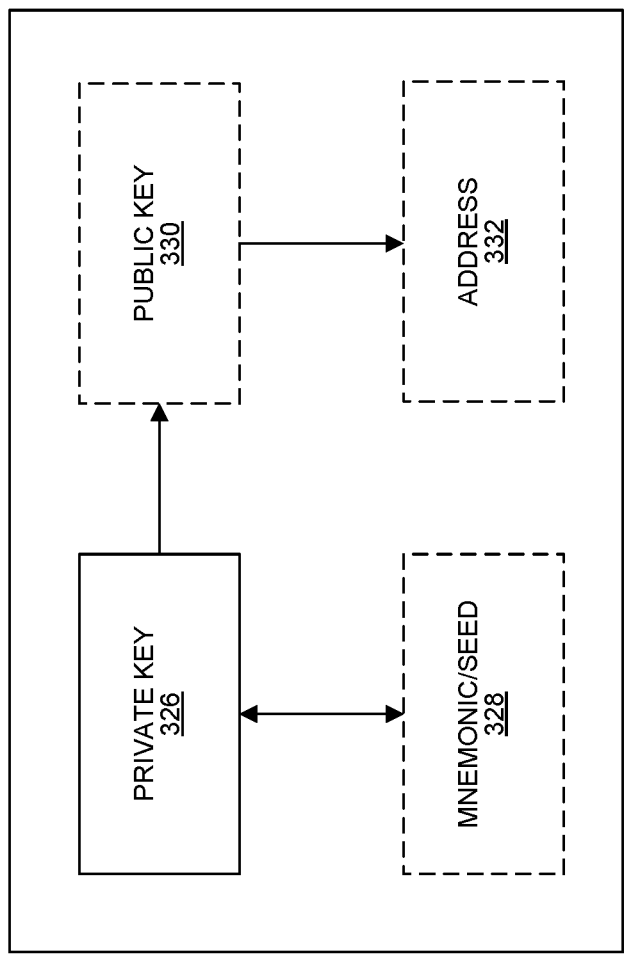
FIG. 3 is a block diagram illustrating private key generation in a wallet.

FIG. 3 is a block diagram illustrating private key 326 generation in a wallet 114. In examples, the wallet 114 generates different data at or near the same time that it generates the private key 326. In examples, the wallet 114 generates (1) a private key 326; (2) an optional mnemonic/seed 328 derived from the private key 326; (3) an optional public key 330; and/or (4) at least one optional address 332 in a distributed ledger 110 (e.g., that holds cryptocurrency). In examples, each of the private key 326, the optional mnemonic/seed 328, the optional public key 330, and the at least one optional address 332 are represented as a different string of characters. In examples, the private key 326 in FIG. 3 is a private account key 204 and the public key 330 in FIG. 3 is a public account key 205. Alternatively, the private key 326 in FIG. 3 could be a private transaction key 206 and the public key 330 in FIG. 3 could be a public transaction key 207 (in which case, the optional address 332 could be a transaction address on a distributed ledger 110).

In examples, the private key 326 and public key 330 (and optionally the address 332) are generated using a single function. In examples, the optional public key 330 corresponds to and is derived from the private key 326. The private key 326, however, would generally not be derivable from the public key 330. In examples, the private key 326 may be used to spend funds out of the optional address 332, while the optional public key 330 can be used to monitor transactions in and out of the address 332 or send cryptocurrency (or other digital asset) to the address 332. In examples, the private/public key 330 pair is generated, and a hash of the public key 330 is a transaction address 332 (for a distributed ledger 110) that can be used to transact into a wallet 114. The private key 326 would generally be kept secure (e.g., not shared with other computing devices), while the public key(s) 330 330 could be shared more freely (with a greater number of users having access to it).

A mnemonic code or seed 328 may be used to recover the private key 326 if it is lost. In examples, the mnemonic code or seed 328 is a set of words (e.g., 12 or 15 words) from which the private key 326 can be derived. In examples, the mnemonic code or seed 328 is initially derived from the private key 326. In examples, the address 332 would be derived from the public key 330, but the public key 330 may not be derivable from the address 332.

Optionally, the wallet 114 generates the private key 326 by generating a sequence having random or pseudo-random characteristics. Optionally, the private key 326 may be generated according to Bitcoin Improvement Proposal 39 (BIP39). In examples, the corresponding public key 330 is generated from the private key 326 by using elliptical curve multiplication (a type of cryptographic function). Then, as mentioned above, the address 332 may be a hash of the public key 330.

Figure 4:
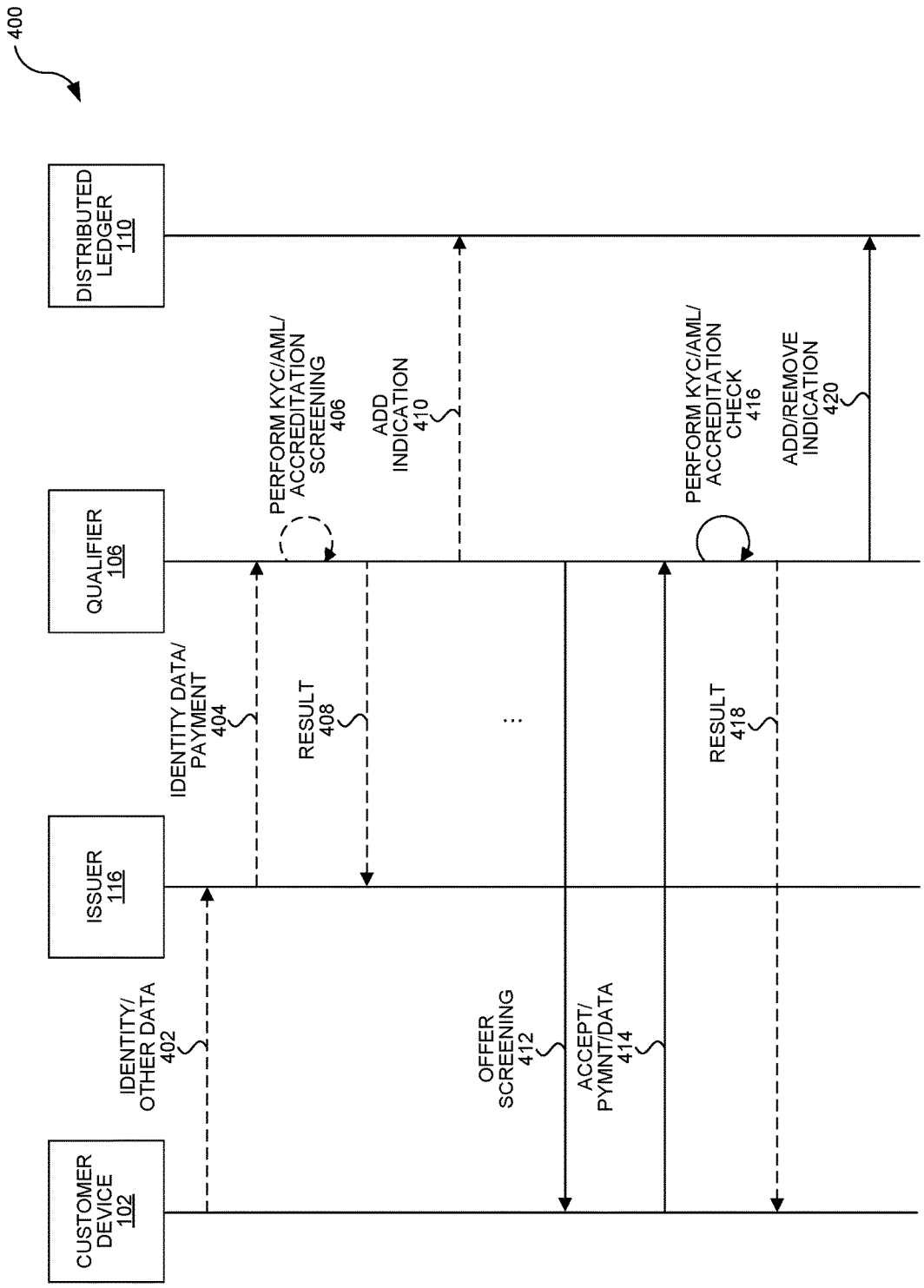
FIG. 4 is a sequence diagram illustrating a sequence for account-owner-funded KYC, AML, and/or other accredited investor screening.

FIG. 4 is a sequence diagram illustrating a sequence 400 for account-owner-funded KYC, AML, and/or other accredited investor screening. Specifically, FIG. 4 illustrates actions of and communication between a customer device 102, an issuer 116, a qualifier 106, and a distributed ledger 110 (e.g., at least one node implementing the distributed ledger 110). In examples, the actions performed by the various devices/systems in FIG. 4 are performed by their respective at least one processor executing instructions stored in their respective memories.

In examples, the communication between devices/systems in FIG. 4 can utilize any suitable transmission path(s), including one or more networks 112. In examples, the various transmissions illustrated in FIG. 4 may be encrypted and/or otherwise transmitted securely, e.g., using Hypertext Transfer Protocol Secure (HTTPS) with Transport Layer Security (TLS). The order of the steps in FIG. 4 is merely exemplary and could be changed in different configurations and steps noted as optional might not be performed at all.

In examples, the sequence 400 begins at optional step 402 when the customer wants to acquire, for the first time, security token(s) issued/deployed by the issuer 116. In examples, the token(s) may be acquired as part of a security token offering (STO), gift, purchase, and/or employee compensation from the issuer 116. It should be noted that the customer may initially acquire the token(s) from a third party (not the issuer 116), in which case, the customer may request and/or self-fund the various KYC, AML, and/or other accredited investor screening (not the issuer 116 as described below).

Alternatively, the sequence 400 could begin at step 412 when the customer's account already holds security token(s) issued/deployed by the issuer 116.

In optional step 402, the customer device 102 may send identity data and/or other data to the issuer 116. In examples, optional step 402 is performed following or during an onboarding process in which a customer creates an account or wallet, e.g., a customer downloads a wallet 114 application, enters their identity data, and the wallet 114 key(s) are generated. In examples, optional step 402 is performed in response to a customer requesting to purchase at least one security token issued by the issuer 116. As described above, security tokens may be regulated, requiring issuers 116 to perform KYC, AML, and/or other accredited investor screening(s) for purchasers (such as SEC Regulation D, Regulation S, or Regulation A). In examples, the customer device 102 also sends a transaction address and/or a public key 330 associated with the customer's account, which can be used to tag the user's account upon completion of the KYC, AML, and/or other accredited investor screening.

In optional step 404, the issuer 116 may send the customer's identity data to a qualifier 106 with a request for KYC, AML, and/or other accredited investor screening. The specific screening(s) requested in optional step 404 may be determined based on regulations and/or requirements in the security token contract itself. In examples, the issuer 116 may also pay a fee to the qualifier 106, e.g., using a cryptocurrency transaction.

In optional step 406, the qualifier 106 may perform KYC, AML, and/or other accredited investor screening for the customer using the identity data received from the issuer 116. Optional step 406 may be considered an "initial" screening because the screening is likely being run for the first time for this particular account/issuer 116 combination.

In optional step 408, the qualifier 106 may transmit a result of the KYC, AML, and/or other accredited investor screening to the issuer 116.

In optional step 410, the qualifier 106 may add an indication to the distributed ledger 110 when the initial screening was successful (the customer passed the KYC, AML, or accredited investor screening in optional step 406). In some examples (e.g., where the distributed ledger 110 is a Ravencoin blockchain), optional step 410 includes recording a tagging transaction into the customer's address on the distributed ledger 110. In examples, when the screening in optional step 406 is for KYC, AML, or accreditation (e.g., under SEC Regulation D, Regulation S, or Regulation A) and the screening is successful, the qualifier 106 may add a #KYC, #AML, or #ACCREDITED tag to the customer's address, respectively. In examples, where more than one screening is performed, a corresponding number of tags are recorded into the customer's address. In examples, the qualifier 106 may pay a small transaction fee to record the tagging transaction in optional step 410.

In other examples (e.g., where the distributed ledger 110 is an Ethereum blockchain), optional step 410 may include adding the customer's address to a whitelist in a smart contract, e.g., a smart contract that the token contract calls with a function call or the smart contract itself. In examples, the smart contract stores a different whitelist for each type of screening, e.g., a first whitelist for addresses passing a KYC screening, a second whitelist for addresses passing an AML screening, a third whitelist for addresses passing an accredited investor screening (e.g., under Regulation D, Regulation S, Regulation A, etc.), etc. Alternatively, a single whitelist may be able to store indications relating to different types of screenings, e.g., a single whitelist that can store indications of whether a respective customer associated with a respective address has passed KYC, AML, and/or accredited investor screening(s). In examples, the smart contract implementing the whitelist(s) are stored on the distributed ledger 110, thus, adding the customer's address to the whitelist may incur a small transaction fee payable by the issuer 116.

Following optional step 410, assume the customer has acquire security token(s), e.g., as part of a security token offering (STO), gift, purchase, and/or employee compensation. This step is not shown, but the customer may have acquired the security token(s) from the issuer 116 or another party. As mentioned above, the security token(s) may be restricted in such a way that the token(s) can only be held, transferred from, and/or acquired in transaction accounts/addresses with owners' that have passed KYC, AML, and/or accredited investor screening. This restriction may be built into the distributed ledger 110 (e.g., in the case of Ravencoin blockchain) and/or via rules implemented in smart contracts (e.g., in the case of Ethereum). Therefore, a customer may be forbidden from selling their existing security token(s) and/or purchasing new security token(s) if the KYC, AML, and/or accredited investor screening performed for their address lapses. Alternatively, security token(s) may be restricted in such a way that the token(s) can only be acquired into addresses that maintain valid KYC, AML, and/or accredited investor screening, but may hold or transfer from addresses without up-to-date KYC, AML, and/or accredited investor screening.

In step 412, the qualifier 106 may send the customer (e.g., via the customer device 102) an offer for renewal screening. In examples, the offer indicates the customer's address, a qualifier address to receive payment from the customer, and/or the specific screening that requires (or will soon require) renewal. In examples, KYC, AML, and/or accredited investor screening expires after some period of time, e.g., 6 months, 3 months, or one month. This period of time may depend on the business practices of the qualifier 106 in order to comply with the Bank Secrecy Act (BSA) and/or Patriot Act. In examples, this period of time is based on the profile of the customer and their known behaviors. Once the qualifier 106 has determined that a customer's previous KYC, AML, and/or accredited investor screening has expired or is near expiry (e.g., within a certain number of days or weeks of expiration), the qualifier 106 may send the offer for renewal screening to the customer. The offer may be sent via any suitable means, e.g., email, SMS message, push notification, mailed letter, etc. In examples, the qualifier 106 is able to contact the customer using the customer's identity data collected for a previous (e.g., initial) screening.

In step 414, the customer device 102 may indicate acceptance of the renewal screening offer and send payment to the qualifier 106. In examples, the payment is performed using a cryptocurrency transaction from the customer's address (that needs renewal screening) to the qualifier's address. In examples, the qualifier 106 proceeds with renewal screening (in subsequent steps) only when the payment is received from the same customer address that needs the renewal screening because this indicates that the customer is still in possession of the address. In examples, the cryptocurrency transaction used to make the payment in step 414 may be sent to the distributed ledger 110. In examples, when the customer pays from a different address than the one that needs renewal screening, the qualifier 106 may respond to the customer and require them to provide some indication that they are still in control of the address in need of renewal screening. In examples, the initial screening (e.g., in optional step 406) may be more thorough and, therefore, may be more expensive than renewal screening(s) (e.g., in step 416).

Optionally, the customer device 102 also sends identity data for the customer to the qualifier 106 in step 414. In examples, customer device 102 may send only identity data that has changed in the past period of time, e.g., since the previous screening. In examples, the offer (in step 412) includes the identity data from the previous screening and prompts the user to confirm that the previous identity data is still accurate (the confirmation could be sent back to the qualifier 106 in step 414). Alternatively, the customer may be prompted to confirm the accuracy of only identity data likely to change (e.g., address), but not other identity data unlikely to change (e.g., social security number). Alternatively, the customer device 102 may send all new identity data in step 414.

In step 416, the qualifier 106 performs renewal KYC, AML, and/or accredited investor screening for the customer's address. In examples, the renewal screening may include comparing any of the user's identity data to database(s) maintained by various law enforcement and/or other government agencies, e.g., database(s) updated periodically and/or at the time of screening. In examples, different database(s) may be used depending on whether the KYC, AML, and/or accredited investor screening is performed, e.g., a first set of database(s) for KYC screening, a second set of database(s) for AML screening, and a third set of database(s) for accredited investor screening where any of the first, second, and third sets of database(s) may overlap. In examples, the absence of any of the customer's identity data in the database(s) used for a particular screening may indicate that the customer passes the renewal screening.

In optional step 418, the qualifier 106 may send the result of the renewal screening to the customer (e.g., via the customer device 102). In examples, the result may be sent via any suitable means, e.g., email, SMS message, push notification, mailed letter, etc.

In step 420, the qualifier 106 may add or remove an indication from the distributed ledger 110. In examples, when step 416 is for KYC, AML, or accredited investor screening (e.g., under SEC Regulation D, Regulation S, or Regulation A) and the screening is successful, the qualifier 106 may add a #KYC, #AML, or #ACCREDITED tag to the customer's address, respectively. Alternatively or additionally, the indication may include adding the customer's address to at least one whitelist in a smart contract, e.g., a smart contract that the token contract calls with a function call or the smart contract itself. In either case, recording the indication in step 420 may incur some small transaction fee.

Qualifiers can also revoke indications, such as when a subsequent KYC, AML, and/or accreditor investor screening fails. In examples, when a renewal screening fails (e.g., the customer's identity data is found in one of the database(s)), the indication associated with the customer's address (e.g., at least one tag in the customer address on the distributed ledger 110 or the customer's address listed in whitelist(s) on the smart contract) may be revoked/removed.

In tagging examples, the qualifier 106 may own the particular tag (e.g., #KYC, #AML, or #ACCREDITED), thus giving the qualifier 106 exclusive authority to add or remove the tag from addresses in the distributed ledger 110. In examples, this exclusive authority is evidenced by a unique qualifier token purchased and held by the qualifier 106. In examples, the qualifier token may be copied up to a certain number of times, e.g., to be distributed within the qualifier's organization for business continuity purposes.

Generally, the initial screening (e.g., in optional step 406) and renewal screening(s) (e.g., in step 416) are both performed by the same qualifier 106. However, the initial screening (e.g., in optional step 406) could possibly be performed by a first identity services provider with renewal screening(s) (e.g., in step 416) being performed by the qualifier 106 (different than the first identity services provider).

Figure 5A:
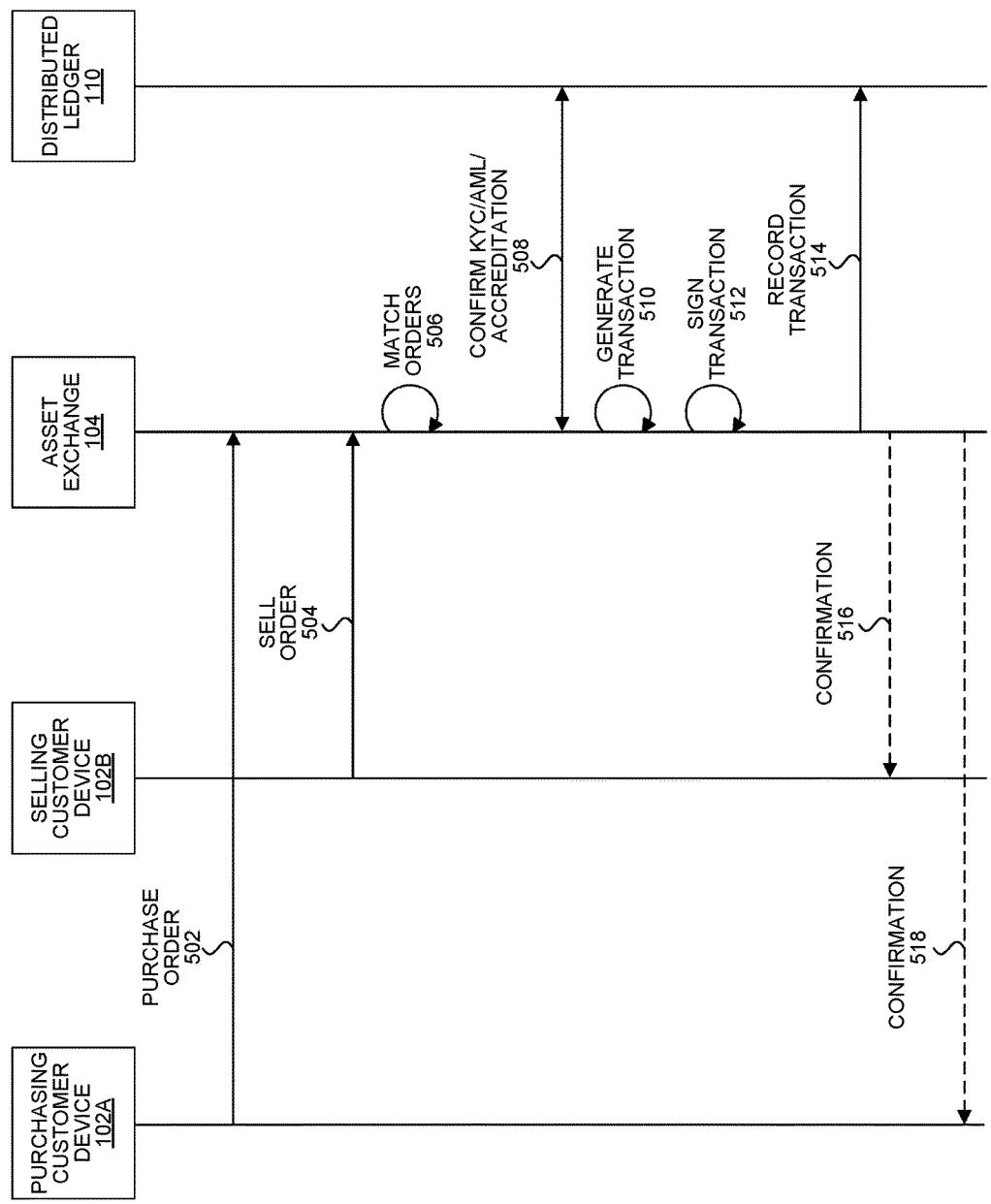
FIGS. 5A-5B are sequence diagrams illustrating sequences for confirming KYC, AML, and/or other accredited investor screening has occurred before executing a transaction transferring a security token from a selling customer to a purchasing customer.
Figure 5B:
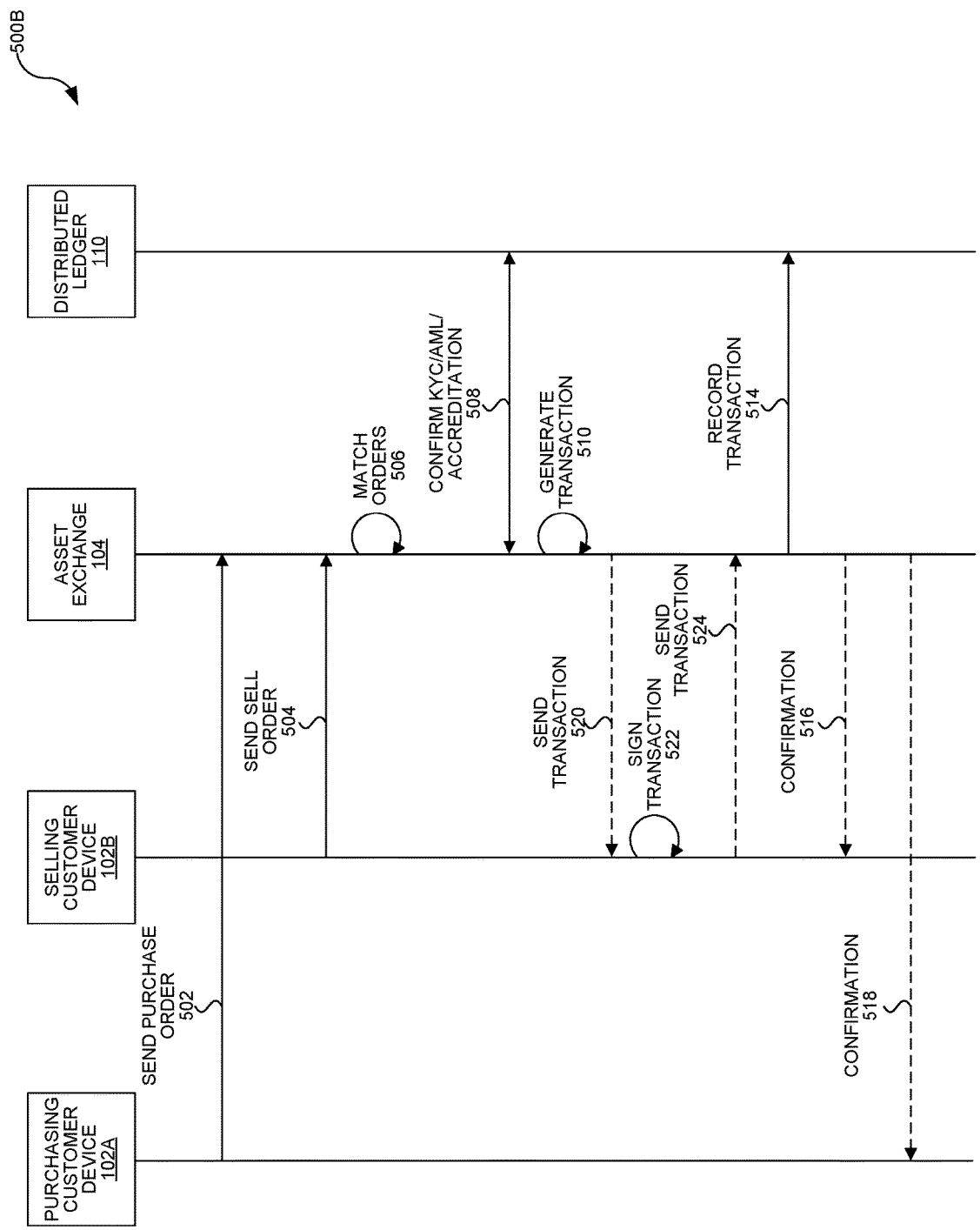

FIGS. 5A-5B are sequence diagrams illustrating sequences 500A, 500B for confirming KYC, AML, and/or other accredited investor screening has occurred before executing a transaction transferring a security token from a selling customer to a purchasing customer. Specifically, FIGS. 5A-5B illustrates actions of and communication between a purchasing customer device 102A, a selling customer device 102B, an asset exchange 104, and a distributed ledger 110 (e.g., at least one node implementing the distributed ledger 110). In examples, the actions performed by the various devices/systems in FIGS. 5A-5B are performed by their respective at least one processor executing instructions stored in their respective memories. In examples, the sequences 500A or 500B may performed at some time after the sequence 400 in FIG. 4.

In examples, the communication between devices/systems in FIGS. 5A-5B can utilize any suitable transmission path(s), including one or more networks 112. In examples, the various transmissions illustrated in FIGS. 5A-5B may be encrypted and/or otherwise transmitted securely, e.g., using Hypertext Transfer Protocol Secure (HTTPS) with Transport Layer Security (TLS). The order of the steps in FIGS. 5A-5B is merely exemplary and could be changed in different configurations and steps noted as optional might not be performed at all.

Referring specifically to FIG. 5A, the sequence 500A begins at step 502 where a purchasing customer device 102A may transmit a purchase order to an asset exchange 104. An "order" is a request to initiate a transaction or data that describes a request to initiate a transaction. In examples, the purchase order may include various parameters, e.g., an indication of the type of security token being purchased, the quantity of the security token being purchased, the address from which cryptocurrency will be taken to fund the purchase, an address to which the purchased security token(s) will be received, a limit price (above which the purchaser is not willing to purchase), whether the purchasing customer is willing to accept partial fill of the order, conditional triggering requirements, and/or a duration of the order (after which the order will expire).

In step 504, a selling customer device 102B may transmit a sell order to the asset exchange 104. In examples, the sell order may include various parameters, e.g., an indication of the type of security token being sold, the quantity of the security token being sold, the address to which proceeds (e.g., cryptocurrency) of the sale will be deposited, an address from which the sold security token(s) will be taken, a limit price (below which the seller is not willing to sell), whether the selling customer is willing to accept partial fill of the order, conditional triggering requirements, and/or a duration of the order (after which the order will expire).

In step 506, the asset exchange 104 may match at least two orders together. In examples, the asset exchange 104 receives many purchase orders and many sell orders throughout a given window of time. In examples, the asset exchange 104 may match orders on a first-come, first-serve basis assuming they are compatible to be matched together in terms of the type of security token, quantity, etc. Optionally, the asset exchange 104 may match more than two orders together, e.g., when more than one purchase order is used to fill a particular sell order or when more than one sell order is used to fill a particular purchase order. Optionally, orders received at different asset exchanges 104 may be matched together in which case one of the asset exchanges 104 may communicate the order it receives to the other asset exchange 104. Assume, however, that the purchase order (from step 502) and the sell order (from step 504) are both received at the same asset exchange and matched together in step 506.

In step 508, the asset exchange 104 may confirm that the proper KYC, AML, and/or accredited investor screening has taken place for the seller (e.g., the seller's address has the required tag(s) or the seller's address or public key 330 is listed on the proper whitelist(s)) and/or the purchaser (e.g., the purchaser's address has the required tag(s) or the purchaser's address or public key 330 is listed on the proper whitelist(s)). In examples, the screening required for a particular transaction is based on the restrictions the distributed ledger 110 places on the type of security token being purchased, sold, or traded, e.g., all security tokens of type X can only be sent to addresses with #KYC, #AML, and/or #ACCREDITED tags. In tagging examples, the asset exchange 104 may use the purchasing customer's address or public key 330 to verify the purchaser's address holds the proper tag(s). In tagging examples, the asset exchange 104 may use the selling customer's address or public key 330 to verify the seller's address holds the proper tag(s). In whitelist examples, the asset exchange 104 may use the purchasing customer's address or public key 330 to verify the purchaser's address is listed in the proper whitelist(s). In whitelist examples, the asset exchange 104 may use the selling customer's address or public key 330 to verify the seller's address is listed in the proper whitelist(s).

In examples, the "proper" screening confirmed in step 508 may be determined based on the type of screening (KYC, AML, accreditation, etc.) required for the tokens involved in the desired transaction and, optionally, the recency of previous screening(s) evidenced by tag(s) on customer address(es) and/or customer address(es) or public key(s) 330 on at least one whitelist. In examples, the proper screening for a first token type includes KYC, while the proper screening for a second token type includes KYC and accreditation (e.g., under SEC Regulation D, Regulation S, or Regulation A).

In examples where the purchase order and the sell order are initially received at different asset exchanges 104, each asset exchange may be responsible for confirming that the proper KYC, AML, and/or accredited investor screening has taken place for their respective customer(s) in the transaction. In examples, a first asset exchange 104 may receive the purchase order(s) and confirm that the proper screening has occurred for the purchasing customer(s), while a second asset exchange 104 may receive the sell order(s) and confirm that the proper screening has occurred for the selling customer(s).

When either the purchasing customer's transaction address and/or the selling customer's transaction address are not properly tagged or whitelisted (not shown in FIG. 5A), the asset exchange 104 may notify the purchasing customer device and/or the selling customer of the problem. In this case, the sequence 500A would not proceed to step 510 unless and until the proper screening was performed.

In step 510, the asset exchange 104 may generate a transaction in response to confirming that the purchaser and/or seller have passed their required screening(s) based on the type of security token being transacted. In examples, the transaction indicates at least the type of asset (e.g., security token) being bought/sold, an amount of the asset (e.g., security token) being bought/sold, the purchasing customer's address (where they would like to hold the purchased token(s)), and the selling customer's address (where the token(s) are currently held).

In step 512, the asset exchange 104 may sign the transaction using at least one private key 326. In examples, the asset exchange 104 may sign the transaction only after requesting and receiving confirmation of the generated transaction from the selling customer device 102B and/or the purchasing customer device 102A. In examples, the asset exchange 104 uses the selling customer's private key 326 for the address where the security token(s) are currently held. In examples, the selling customer's private key 326 may be sent to the asset exchange 104 or previously generated by (and stored on) the asset exchange 104. Alternatively, the security token(s) may be held in a custodial wallet (implemented on the asset exchange 104) on behalf of the selling customer, in which case the asset exchange would sign the transaction using at least one private key 326 for the custodial wallet.

In step 514, the asset exchange 104 may record the transaction on the distributed ledger 110. In examples, step 514 may include sending the transaction to one of the nodes implementing the distributed ledger 110 and, in some cases, paying a transaction fee (e.g., cryptocurrency). In some configurations, the asset exchange 104 is a system of computing devices that includes a node implementing the distributed ledger 110, in which case the asset exchange 104 could record the signed transaction on the distributed ledger 110 without sending to an external device/system.

In optional steps 516 and 518, the asset exchange 104 may send confirmations of the transaction being executed to the selling customer device 102B and the purchasing customer device 102A, respectively.

Referring to FIG. 5B, the sequence 500B also illustrates actions of and communication between a purchasing customer device 102A, a selling customer device 102B, an asset exchange 104, and a distributed ledger 110 (e.g., at least one node implementing the distributed ledger 110), which operate according to similar principles and methods as those described in conjunction with the sequence in FIG. 5A. Furthermore, where a step in FIG. 5B shares the same reference number as a step in FIG. 5A, it refers to a similar or identical step.

In optional step 520, however, the asset exchange 104 may send the transaction to the selling customer device 102B.

In optional step 522, the selling customer device 102B signs the transaction, e.g., using at least one private key 326 accessible only by the selling customer.

In optional step 524, the selling customer device 102B may send the signed transaction to the asset exchange 104.

In step 514-518, the asset exchange 104 may record the transaction on the distributed ledger 110 and send confirmations, similar to FIG. 5A. Alternatively, the selling customer device 102B may send the signed transaction to the distributed ledger 110 for recording (instead of sending it to the asset exchange 104). In some configurations, the asset exchange 104 is a system of computing devices that includes a node implementing the distributed ledger 110, in which case the asset exchange 104 could record the signed transaction on the distributed ledger 110 without sending to an external device/system.

Figure 6:
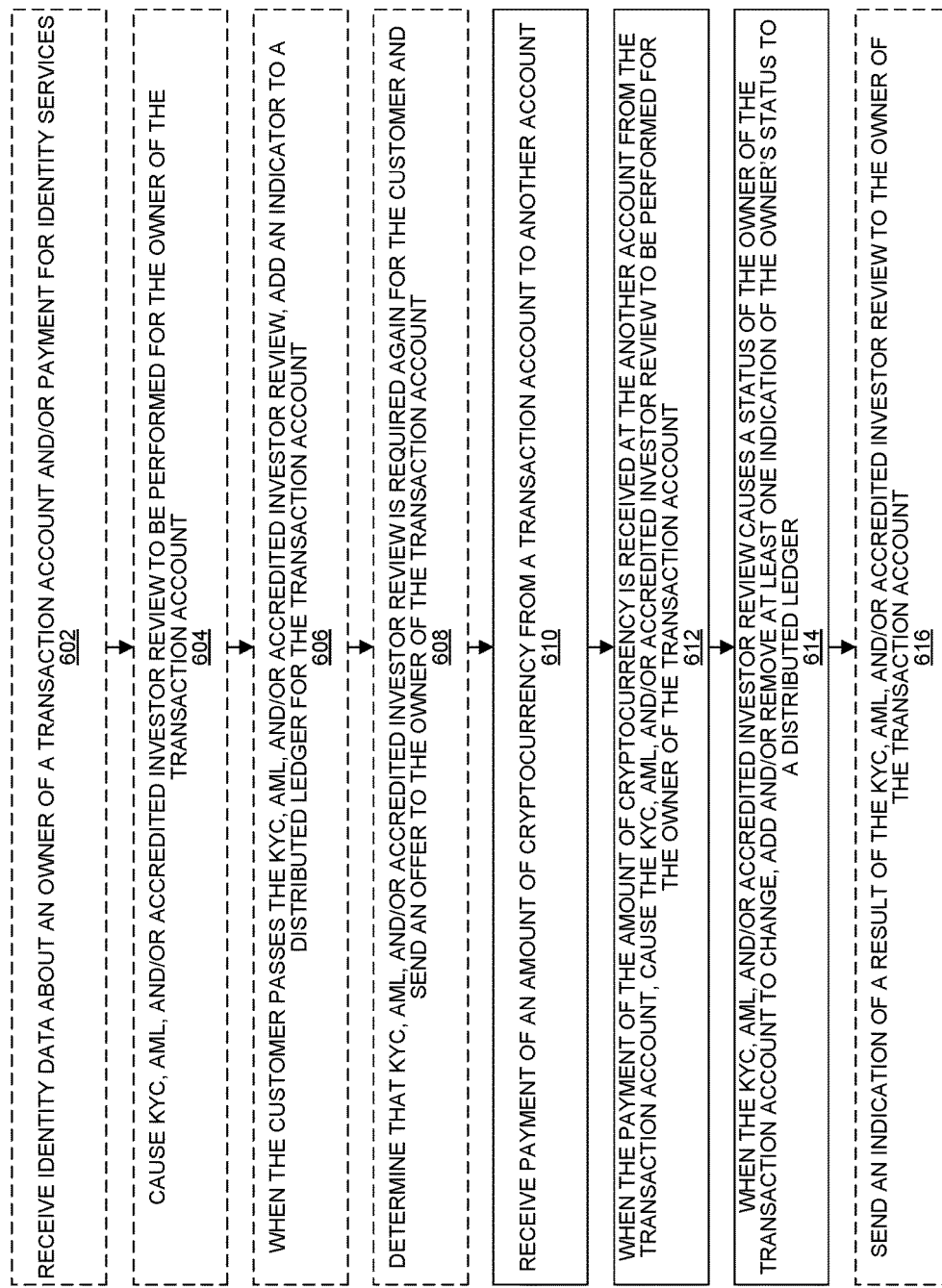
FIG. 6 is a flow diagram illustrating a method for account-owner-funded KYC, AML, and/or other accredited investor screening.

FIG. 6 is a flow diagram illustrating a method 600 for account-owner-funded KYC, AML, and/or other accredited investor screening. Any or all of the method 600 may be performed by at least one processor, in a qualifier 106, executing instructions stored in at least one memory.

In optional step 602, the qualifier 106 may receive identity data about an owner of a transaction account (e.g., customer) and/or payment for identity services. In examples, the owner may be an individual desiring to buy and/or sell tokenized assets, such as security token(s), e.g., restricted security token(s) that can only be held, transferred from, and/or acquired in transaction accounts/addresses with owners' that have passed KYC, AML, and/or accredited investor screening. In examples, the identity data may include the owner's name, date of birth, driver's license number and expiration date, address, phone number(s), email address(es), social security number, an image of the owner's government issued photo identification, a photo of the owner holding the government issued photo identification, employment information, and/or the owner's income. In examples, the optional payment may come from an issuer 116 of a security token that the owner wants to purchase.

In optional step 604, the qualifier 106 may cause KYC, AML, and/or accredited investor review to be performed for the owner of the transaction account (e.g., customer). In other words, the qualifier 106 performs the owner review itself, which is required for a specific tokenized asset (e.g., security token(s)). Alternatively, the qualifier 106 may cause the KYC, AML, and/or accredited investor review to be performed for the owner by a separate identity services provider 106 (instead of performing the review itself).

In optional step 606, the qualifier 106 may, when the owner passes the KYC, AML, and/or accredited investor review, add an indicator to the distributed ledger 110 for the transaction account. In tagging examples, optional step 606 may include recording a tagging transaction on the distributed ledger 110, e.g., recording a #KYC, #AML, and/or #ACCREDITED tag to the owner's transaction account/address in response to the owner passing KYC, AML, and/or accredited investor screening, respectively. In whitelisting examples, optional step 606 may include adding the owner's transaction account/address (or public key 330) to at least one whitelist in a smart contract on the distributed ledger 110, e.g., a smart contract that the token contract calls with a function call or the smart contract itself.

In optional step 608, the qualifier 106 may determine that KYC, AML, and/or accredited investor review is required again for the owner and send an offer to the owner of the transaction account. The period of time before a previous KYC, AML, and/or accredited investor review for an owner expires may depend on the business practices of the qualifier 106 in order to comply with the Bank Secrecy Act (BSA) and/or Patriot Act. In examples, this period of time (e.g., 1-6 months) is based on the profile of the owner and their known behaviors. In examples, previous KYC, AML, and/or accredited investor reviews may expire on different days even if they were previously performed on the same day. In examples, the offer may indicate the screening needed, the transaction account, and/or the price for the service.

In step 610, the qualifier 106 may receive payment of an amount of cryptocurrency from a transaction account to another account. In examples, the transaction account is an address (on the distributed ledger 110) belonging to the owner being offered the renewal KYC, AML, and/or accredited investor review. In examples, the another account is an address (on a distributed ledger 110) belonging to the qualifier 106.

In step 612, when the payment of the amount of cryptocurrency is received at the another account from the transaction account, the qualifier 106 may cause the (renewal) KYC, AML, and/or accredited investor review to be performed for the owner of the transaction account. In some examples, the qualifier 106 performs the KYC, AML, and/or accredited investor review. In other examples, the qualifier 106 contracts with a separate identity services provider 106 to perform the KYC, AML, and/or accredited investor review. In examples, the KYC, AML, and/or accredited investor review may include comparing any of the user's identity data to database(s) maintained by various law enforcement and/or other government agencies.

In examples, the qualifier 106 verifies that the cryptocurrency payment in step 612 was received from the same transaction account that needs KYC, AML, and/or accredited investor review to be performed again. In some examples, the qualifier 106 causes the KYC, AML, and/or accredited investor review to be performed only after confirming that the cryptocurrency payment was received from the same transaction account that needs KYC, AML, and/or accredited investor review to be performed again. In examples, verifying that the source of the payment may include searching the distributed ledger 110 (e.g., using a blockchain explorer) and/or receiving a notification that the cryptocurrency was received into the qualifier's address from the transaction account/address.

In step 614, when the KYC, AML, and/or accredited investor review causes a status of the owner of the transaction account to change, the qualifier 106 may add or remove an indication of the owner's status to the distributed ledger 110. In tagging examples, step 614 may include recording a tagging transaction into the transaction address on the distributed ledger 110, e.g., recording a #KYC, #AML, and/or #ACCREDITED tag to the owner's transaction account/address in response to the owner passing KYC, AML, and/or accredited investor review, respectively. In whitelisting examples, step 614 may include adding the owner's transaction account/address (or public key 330) to at least one whitelist in a smart contract, e.g., a smart contract that the token contract calls with a function call or the smart contract itself.

In examples where a previous owner review was successful (e.g., KYC, AML, and/or accredited investor review) and a follow-up owner review for the same owner was also successful, no change would generally be required because the corresponding tag(s) would already be recorded on the owner's transaction account/address (or the owner's address or public key 330 would already be listed on the whitelist (s)). In examples where a previous owner review was successful and a follow-up owner review for the same owner was unsuccessful, tag(s) may be removed on the owner's transaction account/address (or the owner's transaction account/address or public key 330 would be removed from the whitelist(s)). In examples where a previous owner review was unsuccessful and a follow-up owner review for the same owner was successful, a new tag may be added to the owner's transaction account/address (or the owner's address or public key 330 would added to the whitelist(s)). In examples where a previous owner review was unsuccessful and a follow-up owner review for the same owner was unsuccessful, no change is generally necessary.

In optional step 616, the qualifier 106 may send an indication to the owner of the result of the KYC, AML, and/or accredited investor review.

Figure 7:
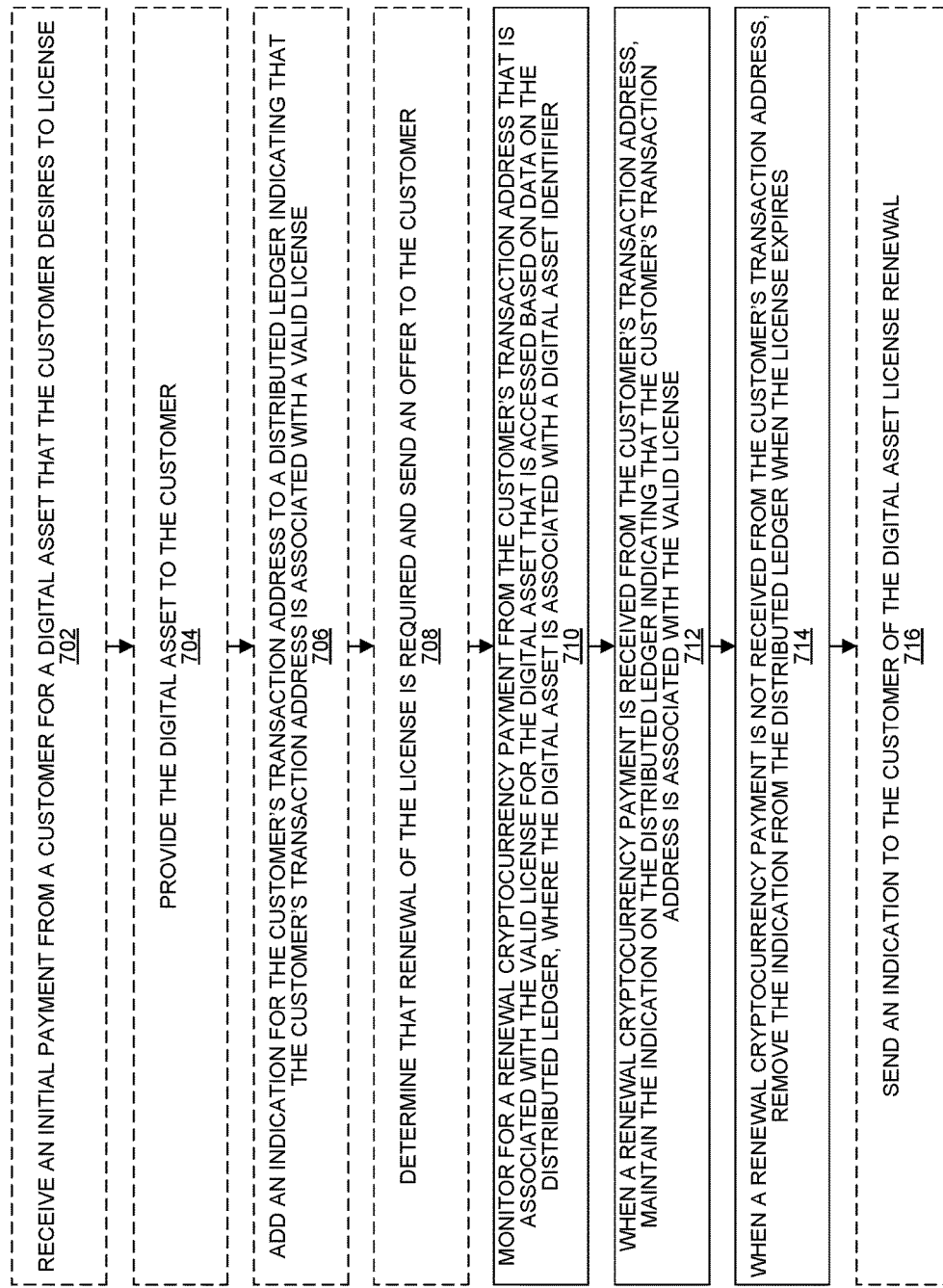
FIG. 7 is a flow diagram illustrating a method for renewing a license for a digital asset.

FIG. 7 is a flow diagram illustrating a method 700 for renewing a license for a digital asset. At least some of the method 700 may be performed by at least one processor in a qualifier 106 executing instructions stored in at least one memory.

In examples of the method 700, the qualifier 106 may be the creator of an underlying digital asset, e.g., the manufacturer or publisher. Alternatively, in examples of the method 700, the qualifier 106 may be a third party that handles the licensing, including licensing renewals, of the digital assets created by the manufacturer or publisher.

Digital assets include, but are not limited to, a software program (a set of instructions executable by at least one processor), a digital movie, digital music, a video game, a digital document, a digital image, other digital media, etc. Additionally, achievements and digital assets earned within a video game ecosystem (e.g., a weapon, achievement, costume, etc.) may be considered digital assets. A digital asset identifier is any unique string of characters capable associating a licensee with their underlying digital asset, e.g., a license, key, serial number, or other identifier.

Generally, and without limitation, non-fungible digital assets are discussed herein, e.g., assets that are uniquely identifiable using a digital asset identifier. A digital asset may be non-fungible due to the uniqueness of its digital asset identifier and/or due to attributes of the digital asset that are different from other instances.

In some examples, the digital asset in the method 700 is one that is accessed based on data stored on a distributed ledger 110, e.g., a digital asset that can only be installed and/or used based on data on the distributed ledger 110. For example, the customer would purchase a subscription or license (for the digital asset) with crypto funds from a transaction address (and the transaction address would be tagged, e.g., #PAID or #CURRENT). The present systems and methods may be used with any suitable verification method that utilizes data stored on a distributed ledger 110. Without limitation, two example configurations for ledger-based access of a digital asset are given below.

In a first example configuration, the customer's public key 330 (or address) is mapped to a traditional account maintained for the customer at/by the qualifier 106 or issuer 116 of the digital asset. The mapping may be performed in response to the customer sending initial payment for the digital asset from their address (and in some cases following the customer's address being tagged or whitelisted by the qualifier 106 or issuer 116). The mapping (between the customer's public key 330 (or address) and the customer's traditional account) may be accomplished by associating the customer's public key 330 (or address) with the customer (or traditional account number) in any suitable database or other data structure with information about the customer's traditional account. Then, in response to the customer attempting to access the digital asset (e.g., using an app): (1) the app would query the customer's traditional account at the qualifier 106 or issuer 116; and (2) the qualifier 106 or issuer 116 would verify that the customer's transaction address (previously mapped to the customer's traditional account) was previously tagged or whitelisted (indicating a valid subscription or license) before the granting the customer access (e.g., view, listen to, execute, or otherwise use) to their digital asset. In other words, executable instructions on the customer device 102, qualifier 106, or issuer 116 could grant the customer access to (e.g., use of) the digital asset only after verifying that the customer's public key 330 (or address), previously associated with the customer's traditional account, is tagged. In the first example configuration, the qualifier 106 or issuer 116 may optionally check to make sure the customer address being added to a customer traditional account is not already associated with another traditional account.

In a second example configuration, the qualifier 106 or issuer 116 may send a challenge string (e.g., with a date in it) to the customer device 102 to be signed by the customer's wallet 114 that holds the customer's private key 326. In response to the customer's wallet 114 signing the challenge string with the customer's private key 326 and returning the signature to the qualifier 106 or issuer 116, the qualifier 106 or issuer 116 would then validate that signature against the customer's address on the distributed ledger 110 that is tagged (or whitelisted). In some configurations, validating the signature may include deriving the customer's public key 330 from the signature; optionally encoding the public key 330; hashing the encoded public key 330; and comparing the resulting hash against the customer's tagged (or whitelisted) address on the distributed ledger. In response to successfully validating the received signature against the customer's address, the qualifier 106 or issuer 116 may grant the customer access to the digital asset, e.g., send an indication to the customer device 102 that access should be granted.

In either the first example configuration or the second example configuration, the customer's private key 326 would never be exposed outside of their wallet 114.

Instead of, or in addition to verifying that the customer's transaction address is tagged, a qualifier 106, issuer 116, or other third party computing device may optionally provide an encrypted version of an asset key (or password, PIN, etc.), which is required in order to install and/or use a digital asset (e.g., software), to the customer device 102 after they purchase the digital asset, e.g., by storing the encrypted asset key on the distributed ledger 110 or sending it to the customer via SMS text message, e-mail, push notification, etc. In these examples, the customer can only decrypt the encrypted asset key using the private key 326 for the customer's transaction address that sent cryptocurrency to pay for the digital asset, while the asset key could be encrypted (e.g., by the qualifier 106, issuer 116, or other third party computing device) using the public key 330 for the same transaction address.

In some configurations, the asset key could be rotated on a periodic basis, e.g., a new asset key could be generated, encrypted (using the public key 330 for the customer's transaction address), and optionally sent to the customer (or the customer can be otherwise be notified of the availability of the new asset key). This type of asset key rotation could occur on any suitable time period, e.g., every 30 seconds, 1 minute, five minutes, 30 minutes, 1 hour, 2 hours, 24, hours, 48 hours, 1 week, 1 month, etc. In one possible configuration, a physical device in the customer's possession (or even the customer device 102 itself) may automatically generate a new encrypted asset key periodically after which the customer would have to decrypt and use it before accessing the digital asset. Optionally, the customer device 102 may also verify a tag on the customer's transaction address on the distributed ledger 110 before the customer can use the digital asset.

In optional step 702, the qualifier 106 may receive an initial payment from a customer for a digital asset that the customer desires to license. In examples, the digital asset is associated with a digital asset identifier. In examples, the license gives the customer/licensee permission to use the digital asset (or other benefits or privileges) for a period of time and requires renewal after the period of time has elapsed. In examples, the customer is an end-user of the digital asset. In examples, the initial payment is made in cryptocurrency. Alternatively, the method 700 may begin at optional step 708 or step 710 after the customer has already purchased the digital asset with the associated digital asset identifier.

In optional step 704, the qualifier 106 may provide the digital asset to the customer. In examples, optional step 704 may also include transmitting the digital asset identifier to the customer (e.g., via at least one network) so the customer can input and/or store the digital asset identifier, e.g., to activate the underlying digital asset. Alternatively, optional step 704 may include transmitting the digital asset identifier to the customer device 102, which then automatically inputs and/or stores the digital asset identifier without intervention by the customer.

In optional step 706, the qualifier 106 may add an indication for the customer's transaction address to a distributed ledger 110 in response to receiving the initial payment. In tagging examples, optional step 706 may include recording a tagging transaction into the customer's transaction address on the distributed ledger 110, e.g., recording a tag into the customer's transaction address (or public key 330) that only the qualifier 106 is able to apply or remove (e.g., because the qualifier 106 is in possession of a unique qualifier token associated with the tag) in response to receiving the cryptocurrency payment from the customer's transaction address. In whitelisting examples, optional step 706 may include adding the customer's transaction address (or public key 330) to at least one whitelist in a smart contract on the distributed ledger 110.

In examples, a customer may have certain privilege(s) or benefits (associated with their license) when an indication (e.g., tag) for their transaction address is stored on the distributed ledger 110, e.g., special privilege(s) during online gameplay; the ability to install and use a software program; the ability/permission to listen to (e.g., stream) digital audio file(s); the ability/permission to view (e.g., stream) digital video file(s); the ability/permission to view a digital document, etc.

In optional step 708, the qualifier 106 may determine that renewal of the license is required and send an offer to the customer. The period of time before a renewal is required may depend on the terms of the license and when the customer most recently purchased or renewed the license. In examples, this period of time may be anywhere from hour(s) to many years. In examples, the offer may indicate the underlying digital asset, the digital asset identifier, the customer's transaction address, and/or the price for renewing the license.

In step 710, the qualifier 106 may monitor for a renewal cryptocurrency payment from the customer's transaction address that is associated with a valid license for a digital asset that is accessed based on (e.g., only after using) data on the distributed ledger 110, where the digital asset is associated with the digital asset identifier. In examples, the customer's transaction address may hold the digital asset identifier (e.g., as encrypted data) itself and/or a tag that indicates that the customer's transaction address is associated with a valid license.

In step 712, when a renewal cryptocurrency payment is received from the customer's transaction address, maintain the indication (e.g., tag) on the distributed ledger 110 indicating that the customer's transaction address is associated with a valid license. In examples, step 712 may also include renewing the license, e.g., in off-chain record(s).

In examples where the customer's transaction address is already associated with a valid license and the renewal cryptocurrency payment is received from the customer's transaction address, no change would generally be required (in terms of adding or removing an indication) because the corresponding tag(s) would already be recorded on the customer's transaction address (or the customer's transaction address or public key 330 would already be listed on the whitelist(s)).

In step 714, when a renewal cryptocurrency payment is not received from the customer's transaction address, the qualifier 106 may remove the indication from the distributed ledger 110 indicating that the customer's transaction address the digital asset identifier expires. In some examples, the qualifier 106 renews the digital asset identifier only when the cryptocurrency payment was received from the same transaction address that already has an indication it is associated with a valid license.

In some configurations, when the customer sends a renewal cryptocurrency payment from a different transaction address, the indication may be removed from the previous transaction address and added to the different transaction address. In this scenario, the customer would subsequently need to sign in to access the digital asset using the private key 326 for the different transaction address (not the previous transaction address), e.g., decrypt an asset key using the private key 326 for the different transaction address before accessing the digital asset.

In tagging examples, removing an indication in step 714 may include recording a tagging transaction on the distributed ledger 110 to remove the tag from the customer's transaction address. In whitelisting examples, step 714 may include removing the customer's address (or public key 330) from at least one whitelist in a smart contract, e.g., a smart contract that the token contract calls with a function call or the smart contract itself.

In examples, the renewal cryptocurrency payment is received at a transaction address on the distributed ledger 110 owned by the qualifier 106. Alternatively, the qualifier 106 may use a separate payment processing system and receive notification of the renewal cryptocurrency payment (with an indication of the transaction address the renewal cryptocurrency payment came from). In examples, receiving the payment from the customer's transaction address indicates that the customer is still in possession of the transaction address. In examples, verifying the payment may include searching the distributed ledger 110 (e.g., using a blockchain explorer) and/or receiving a notification that the cryptocurrency was received into the qualifier's address.

In optional step 716, the qualifier 106 may send an indication to the customer of the digital asset identifier renewal.

Following renewal, the customer may continue to access the digital asset based on data on the distributed ledger 110, e.g., using their private key 326 to prove ownership of the customer transaction address used to renew their license as described in the two example configurations above. Optionally, the customer device 102 may also verify a tag on the customer's transaction address on the distributed ledger 110 before the customer can use the digital asset.

The method 700 is described above as useful in renewing a license for a digital asset based on a renewal cryptocurrency payment being sent to the qualifier 106. Furthermore, the present systems and methods may be used to renew other types of licenses based on different criteria, e.g., a professional license, such as medical or legal, or a driver's license. In examples, a professional license may be renewed upon the licensee providing evidence of completion of continuing education credits in addition to a renewal cryptocurrency payment being made from the licensee's transaction address associated with a valid license. Optionally, a different tag may also be placed on the licensee's transaction address by a rules or fitness committee indicating that the licensee had met the committee's requirements for license renewal (or that the licensee was devoid of any flags that would prevent license renewal). These additional conditions may be implemented in smart contract(s) that checks for various rules before the license can be renewed.

The method 700 possesses a technical improvement over conventional subscription/license renewal for digital assets. Specifically, the present systems and methods utilize cryptography built into a blockchain to verify that the original purchaser of the subscription/license is still in control of their private key 326 associated with the tagged or whitelisted transaction address and, therefore, the tag on or whitelisting of the transaction address can be maintained (following renewal payment) to allow access the subscription/license. Additionally, since the customer's same private key 326 is required to both (1) pay for the subscription/license and/or renewal of it (by signing cryptocurrency transaction(s) with the private key 326) and (2) access the digital asset(s) associated with the subscription/license (e.g., by verifying that a transaction address associated with the private key 326 is tagged), the issuer of the subscription/license can cryptographically verify that the customer accessing the subscription/license is the same customer who paid for that access (because that customer possesses the private key used to do both).

In examples, the systems are implemented using memory and/or processors. In examples, the memory can be any device, mechanism, or populated data structure used for storing information. In examples, the memory can be or include any type of volatile memory, nonvolatile memory, and/or dynamic memory. In examples, the memory can be random access memory, memory storage devices, optical memory devices, magnetic media, floppy disks, magnetic tapes, hard drives, erasable programmable read-only memories (EPROMs), electrically erasable programmable read-only memories (EEPROMs), optical media (such as compact discs, DVDs, Blu-ray Discs) and/or the like. In accordance with some embodiments, the memory may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory. The memory may be used to store instructions for running one or more applications or modules on the processor. In examples, the memory could be used in one or more examples to house all or some of the instructions needed to execute the functionality of the any of the systems devices described herein. The processor can be any known processor, such as a general purpose processor (GPP) or special purpose (such as a field-programmable gate array (FPGA), application-specific integrated circuit (ASIC) or other integrated circuit or circuitry), or any programmable logic device.

The techniques introduced here can be embodied as special-purpose hardware (such as circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, for example, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Computer System Overview

Figure 8:
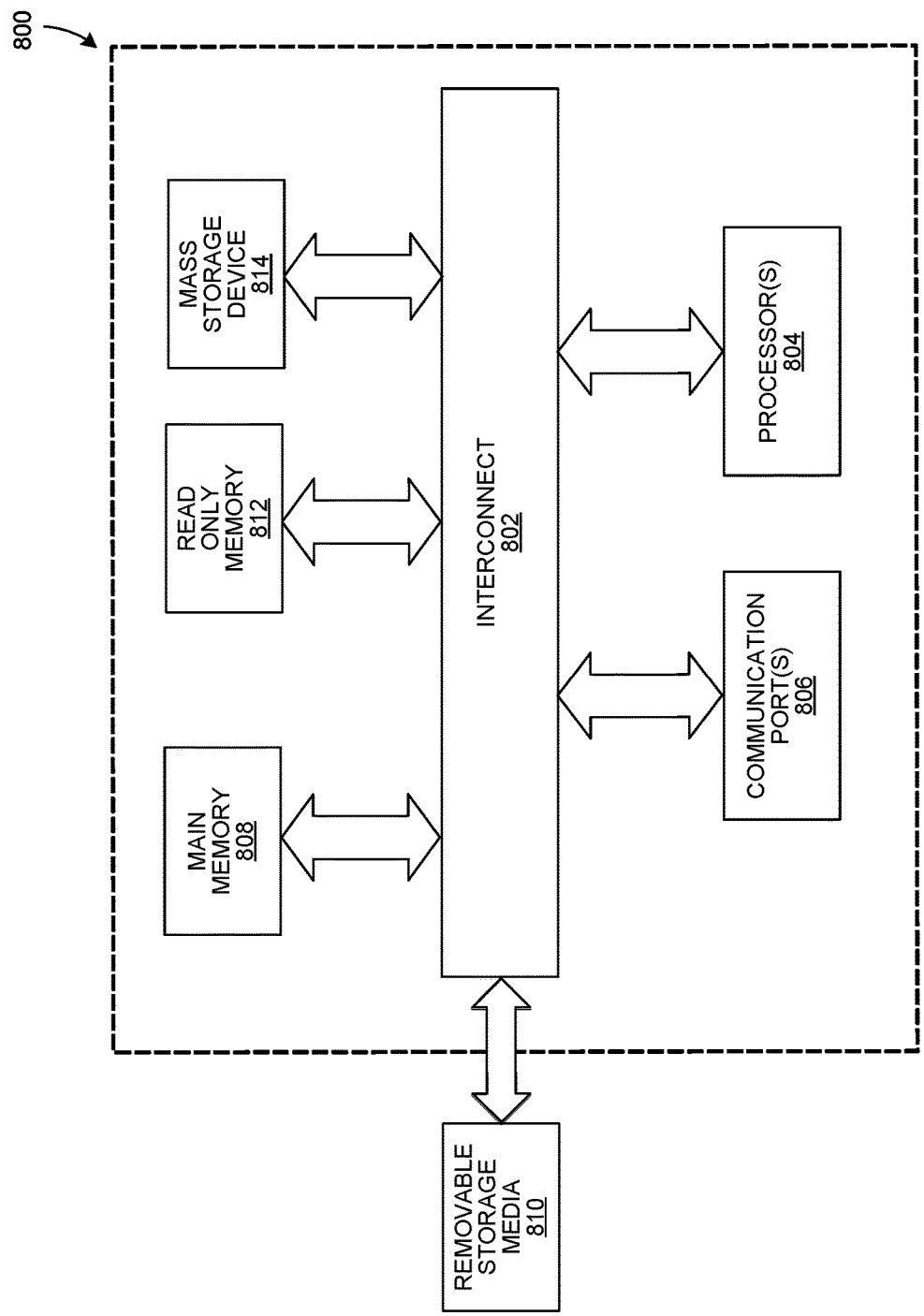
FIG. 8 is a block diagram illustrating an example computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 8 is a block diagram illustrating an example computer system 800 with which embodiments of the present disclosure may be utilized. According to the present example, the computer system 800 includes an interconnect 802, at least one processor 804, at least one communication port 806, at least one main memory 808, at least one removable storage media 810, at least one read only memory 812, and at least one mass storage device 814.

The at least one processor 804 can be any known processor. The at least one communication port 806 can be or include, for example, any of an RS-232 port for use with a modem-based dialup connection, a 10/100 Ethernet port, or a Gigabit port using copper or fiber. The nature of the at least one communication port 806 may be chosen depending on a network such as a Local Area Network (LAN), Wide Area Network (WAN), or any network to which the computer system 800 connects. The at least one main memory 808 can be Random Access Memory (RAM), or any other dynamic storage device(s) commonly known in the art. The at least one read only memory 812 can be any static storage device(s) such as Programmable Read Only Memory (PROM) chips for storing static information such as instructions for the at least one processor 804.

The at least one mass storage device 814 can be used to store information and instructions. For example, hard disks (such as magnetic disk drives or solid state drive using serial/parallel ATA or SCSI interfaces), an optical disc, an array of disks such as a Redundant Array of Independent Disks (RAID), or any other mass storage devices may be used. Interconnect 802 can be or include one or more buses, bridges, controllers, adapters, and/or point-to-point connections. Interconnect 802 communicatively couples the at least one processor 804 with the other memory, storage, and communication blocks. Interconnect 802 can be a PCI/PCI-X or SCSI based system bus depending on the storage devices used. The at least one removable storage media 810 can be any kind of external hard-drives, floppy drives, Compact Disc-Read Only Memory (CD-ROM), Compact Disc-Re-Writable (CD-RW), Digital Video Disc-Read Only Memory (DVD-ROM), Blu-Ray Disc Read Only Memory (BD-ROM), Blu-Ray Disc Recordable (BD-R), Blu-Ray Disc Recordable Erasable (BD-RE).

The components described above are meant to exemplify some types of possibilities. In no way should the aforementioned examples limit the disclosure, as they are only exemplary embodiments.

Figure 9:
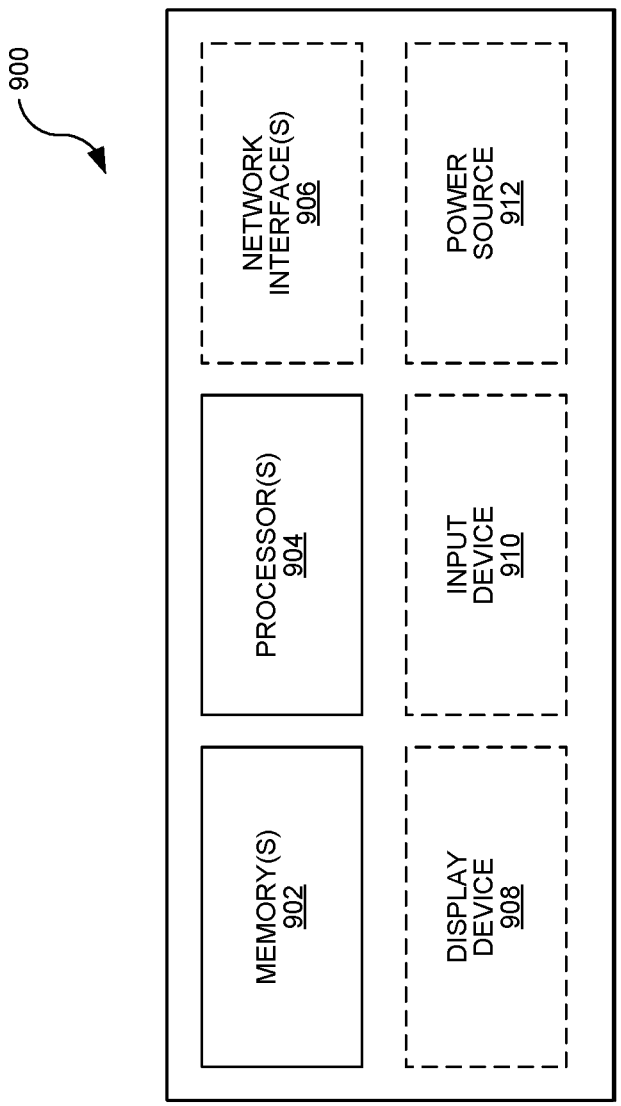
FIG. 9 is a block diagram illustrating another example computing device.

FIG. 9 is a block diagram illustrating another example computing device 900. The example computing device 900 may be used to implement any of the customer device 102, the asset exchange 104, the qualifier/identity services provider 106, and/or the second asset exchange 108. The computing device 900 includes at least one memory 902, at least one processor 904, optional at least one network interface 906, optional display device 908, optional input device 910, and optional power source 912.

In examples, the at least one memory 902 can be any device, mechanism, or populated data structure used for storing information. In examples, the at least one memory 902 can be or include any type of volatile memory, non-volatile memory, and/or dynamic memory. In examples, the at least one memory 902 can be random access memory, memory storage devices, optical memory devices, magnetic media, floppy disks, magnetic tapes, hard drives, erasable programmable read-only memories (EPROMs), electrically erasable programmable read-only memories (EEPROMs), optical media (such as compact discs, DVDs, Blu-ray Discs) and/or the like.

In accordance with some embodiments, the at least one memory 902 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information, which can be used as the at least one memory 902. The at least one memory 902 may be used to store instructions for running one or more applications or modules on the at least one processor 904. In examples, the at least one memory 902 could be used in one or more examples to house all or some of the instructions needed to execute the functionality discussed herein, e.g., in FIG. 6 or 7.

The at least one processor 904 can be any known processor, such as a general purpose processor (GPP) or special purpose (such as a field-programmable gate array (FPGA), application-specific integrated circuit (ASIC) or other integrated circuit or circuitry), or any programmable logic device. In examples, any of the functionality disclosed herein (e.g., in FIG. 6 or 7) may be implemented by the at least one processor 904 and the at least one memory 902.

In examples, the at least one optional network interface 906 includes or is coupled to at least one optional antenna for communication with a network (such as one of the at least one networks 112 of system 100). In examples, the at least one optional network interface 906 includes at least one of an Ethernet interface, a cellular radio access technology (RAT) radio, a Wi-Fi radio, a Bluetooth radio, or a near field communication (NFC) radio. In examples, the at least one optional network interface 906 includes a cellular radio access technology radio configured to establish a cellular data connection (mobile Internet) of sufficient speeds with a remote server using a local area network (LAN) or a wide area network (WAN). In examples, the cellular radio access technology includes at least one of Personal Communication Services (PCS), Specialized Mobile Radio (SMR) services, Enhanced Special Mobile Radio (ESMR) services, Advanced Wireless Services (AWS), Code Division Multiple Access (CDMA), Global System for Mobile Communications (GSM) services, Wideband Code Division Multiple Access (W-CDMA), Universal Mobile Telecommunications System (UMTS), Worldwide Interoperability for Microwave Access (WiMAX), 3rd Generation Partnership Projects (3GPP) Long Term Evolution (LTE), High Speed Packet Access (HSPA), third generation (3G) fourth generation (4G), fifth generation (5G), etc. or other appropriate communication services or a combination thereof. In examples, the at least one optional network interface 906 includes a Wi-Fi (IEEE 802.11) radio configured to communicate with a wireless local area network that communicates with the remote server, rather than a wide area network. In examples, the at least one optional network interface 906 includes a near field radio communication device that is limited to close proximity communication, such as a passive near field communication (NFC) tag, an active near field communication (NFC) tag, a passive radio frequency identification (RFID) tag, an active radio frequency identification (RFID) tag, a proximity card, or other personal area network device.

In examples, the optional at least one display device 908 includes at least one of a light emitting diode (LED), a liquid crystal display (LCD), a light emitting diode (LED) display, an organic light emitting diode (OLED) display, an e-ink display, a field emission display (FED), a surface-conduction electron-emitter display (SED), or a plasma display. In examples, the optional at least one input device 910 includes at least one of a touchscreen (including capacitive and resistive touchscreens), a touchpad, a capacitive button, a mechanical button, a switch, a dial, a keyboard, a mouse, a camera, a biometric sensor/scanner, a microphone, etc. In examples, the optional at least one display device 908 is combined with the optional at least one input device 910 into a human machine interface (HMI) for user interaction with the customer device 102, the asset exchange 104, and/or the optional second asset exchange 108. In examples, at least one optional power source 912 is used to provide power to the various components of the computing device 900.

TERMINOLOGY

Brief definitions of terms, abbreviations, and phrases used throughout this application are given below.

The term "determining" may include calculating, computing, generating, processing, deriving, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the phrase "based on" does not preclude intermediate steps, e.g., A is based on C may mean that B is based on C and A is based on B. Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in exemplary embodiments", "in example embodiments", "in some embodiments", "according to some embodiments", "in the embodiments shown", "in other embodiments", "embodiments", "in examples", "examples", "in some examples", "some examples" and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead are examples. Other systems, devices, and networks to which embodiments of the present disclosure are applicable include, for example, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present disclosure provides novel systems, methods, and arrangements for (1) account-owner-funded KYC, AML, and/or other accredited investor screening; and/or (2) renewing a license for a digital asset that is accessed based on data on a distributed ledger. The present disclosure also provides novel systems, methods, and arrangements for renewing a license for a digital asset. While detailed descriptions of one or more embodiments of the disclosure have been given above, various alternatives, modifications, and equivalents will be apparent to those skilled in the art without varying from the spirit of the disclosure. In some examples, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

EXAMPLE EMBODIMENTS

Example 1 includes a computerized method, comprising: receiving payment of an amount of cryptocurrency from a transaction account to another account; when the payment of the amount of cryptocurrency is received at the another account from the transaction account, causing at least one of KYC, AML, and accredited investor review to be performed for an owner of the transaction account; and when the at least one of the KYC, AML, and accredited investor review causes a status of the owner of the transaction account to change, adding or removing at least one indication of the owner's status in a distributed ledger.

Example 2 includes the computerized method of Example 1, further comprising: receiving identity data about the owner of the transaction account; and receiving payment for identity services.

Example 3 includes the computerized method of Example 2, further comprising causing at least one of KYC, AML, and accredited investor review to be initially performed.

Example 4 includes the computerized method of Example 3, further comprising adding an indication of the owner's status to the distributed ledger when the at least one of KYC, AML, and accredited investor review is initially performed successfully.

Example 5 includes the computerized method of any of Examples 1-4, further comprising sending an indication of a result of the at least one of the KYC, AML, and accredited investor review to the owner of the transaction account.

Example 6 includes the computerized method of any of Examples 1-5, wherein adding at least one indication of the owner's status to the distributed ledger comprises recording at least one tag into the transaction account.

Example 7 includes the computerized method of Example 6, wherein the transaction account is a transaction address on the distributed ledger.

Example 8 includes the computerized method of any of Examples 6-7, wherein exclusive authority to add or remove each of the at least one tag is held by a respective person or entity possessing a respective qualifier token associated with the respective tag.

Example 9 includes the computerized method of any of Examples 1-8, wherein removing at least one indication of the owner's status to the distributed ledger comprises removing at least one tag from the transaction account.

Example 10 includes the computerized method of any of Examples 1-9, wherein adding at least one indication of the owner's status to the distributed ledger comprises adding the transaction account or the owner's public key to at least one whitelist implemented on at least one smart contract.

Example 11 includes the computerized method of any of Examples 1-10, wherein removing at least one indication of the owner's status to the distributed ledger comprises removing the transaction account or the owner's public key from at least one whitelist implemented on at least one smart contract.

Example 12 includes a qualifier computing system, comprising: at least one processor; and at least one memory communicatively coupled to the at least one processor; wherein the at least one processor is configured to: receive payment of an amount of cryptocurrency from a transaction account to another account; when the payment of the amount of cryptocurrency is received at the another account from the transaction account, cause at least one of KYC, AML, and accredited investor review to be performed for an owner of the transaction account; and when the at least one of the KYC, AML, and accredited investor review causes a status of the owner of the transaction account to change, add or remove at least one indication of the owner's status in a distributed ledger.

Example 13 includes the qualifier computing system of Example 12, wherein the at least one processor is further configured to: receive identity data about the owner of the transaction account; and receive payment for identity services.

Example 14 includes the qualifier computing system of Example 13, wherein the at least one processor is further configured to cause at least one of KYC, AML, and accredited investor review to be initially performed.

Example 15 includes the qualifier computing system of Example 14, wherein the at least one processor is further configured to add an indication of the owner's status to the distributed ledger when the at least one of KYC, AML, and accredited investor review is initially performed successfully.

Example 16 includes the qualifier computing system of any of Examples 12-15, wherein the at least one processor is further configured to send an indication of a result of the at least one of the KYC, AML, and accredited investor review to the owner of the transaction account.

Example 17 includes the qualifier computing system of any of Examples 12-16, wherein adding at least one indication of the owner's status to the distributed ledger comprises recording at least one tag into the transaction account.

Example 18 includes the qualifier computing system of Example 17, wherein the transaction account is a transaction address on the distributed ledger.

Example 19 includes the qualifier computing system of any of Examples 17-18, wherein exclusive authority to add or remove each of the at least one tag is held by a respective person or entity possessing a respective qualifier token associated with the respective tag.

Example 20 includes the qualifier computing system of any of Examples 12-19, wherein removing at least one indication of the owner's status to the distributed ledger comprises removing at least one tag from the transaction account.

Example 21 includes the qualifier computing system of any of Examples 12-20, wherein adding at least one indication of the owner's status to the distributed ledger comprises adding the transaction account or the owner's public key to at least one whitelist implemented on at least one smart contract.

Example 22 includes the qualifier computing system of any of Examples 12-21, wherein removing at least one indication of the owner's status to the distributed ledger comprises removing the transaction account or the owner's public key from at least one whitelist implemented on at least one smart contract.

Example 23 includes a computerized method, comprising: monitoring for a renewal cryptocurrency payment from a customer's transaction address that is associated with a valid license for a digital asset that is accessed based on data on a distributed ledger, where the digital asset is associated with a digital asset identifier; when a renewal cryptocurrency payment is received from the customer's transaction address, maintaining an indication on the distributed ledger indicating that the customer's transaction address is associated with the valid license; and when a renewal cryptocurrency payment is not received from the customer's transaction address, removing the indication from the distributed ledger when the license expires.

Example 24 includes the computerized method of Example 23, further comprising: receiving an initial payment from the customer for the digital asset that the customer desires to license; and providing the digital asset to the customer.

Example 25 includes the computerized method of Example 24, further comprising adding the indication to the distributed ledger in response to receiving the initial payment.

Example 26 includes the computerized method of any of Examples 23-25, further comprising determining that renewal of the license is required and sending an offer to the customer.

Example 27 includes the computerized method of any of Examples 23-26, further comprising sending an indication of the license renewal to the customer.

Example 28 includes the computerized method of any of Examples 25-27, wherein adding the indication on the distributed ledger comprises recording a tag into the customer's transaction address on the distributed ledger.

Example 29 includes the computerized method of Example 28, wherein exclusive authority to add or remove the tag is held by a person or entity possessing a qualifier token associated with the tag.

Example 30 includes the computerized method of any of Examples 23-29, wherein removing the indication comprises removing a tag from the customer's transaction address.

Example 31 includes the computerized method of any of Examples 23-30, wherein adding the indication of an owner's status to the distributed ledger comprises adding the customer's transaction address or public key to at least one whitelist implemented on at least one smart contract.

Example 32 includes the computerized method of any of Examples 23-31, wherein removing the indication comprises removing the customer's transaction address or public key from at least one whitelist implemented on at least one smart contract.

Example 33 includes the computerized method of any of Examples 23-32, wherein the digital asset comprises at least one of a digital video, digital music, an achievement or digital asset within a video game ecosystem, and a software program.

Example 34 includes a qualifier computing system, comprising: at least one processor; and at least one memory communicatively coupled to the at least one processor; wherein the at least one processor is configured to: monitor for a renewal cryptocurrency payment from a customer's transaction address that is associated with a valid license for a digital asset that is accessed based on data on a distributed ledger, where the digital asset is associated with a digital asset identifier; when a renewal cryptocurrency payment is received from the customer's transaction address, maintain an indication on the distributed ledger indicating that the customer's transaction address is associated with the valid license; and when a renewal cryptocurrency payment is not received from the customer's transaction address, remove the indication from the distributed ledger when the license expires.

Example 35 includes the qualifier computing system of Example 34, wherein the at least one processor is further configured to: receive an initial payment from the customer for the digital asset that the customer desires to license; and provide the digital asset to the customer.

Example 36 includes the qualifier computing system of Example 35, wherein the at least one processor is further configured to add the indication to the distributed ledger in response to receiving the initial payment.

Example 37 includes the qualifier computing system of any of Examples 34-36, wherein the at least one processor is further configured to determine that renewal of the license is required and send an offer to the customer.

Example 38 includes the qualifier computing system of any of Examples 34-37, wherein the at least one processor is further configured to send an indication of the license renewal to the customer.

Example 39 includes the qualifier computing system of any of Examples 36-38, wherein adding the indication on the distributed ledger comprises recording a tag into the customer's transaction address on the distributed ledger.

Example 40 includes the qualifier computing system of Example 39, wherein exclusive authority to add or remove the tag is held by a person or entity possessing a qualifier token associated with the tag.

Example 41 includes the qualifier computing system of any of Examples 34-40, wherein removing the indication comprises removing a tag from the customer's transaction address.

Example 42 includes the qualifier computing system of any of Examples 34-41, wherein adding the indication comprises adding the customer's transaction address or public key to at least one whitelist implemented on at least one smart contract.

Example 43 includes the qualifier computing system of any of Examples 34-42, wherein removing the indication comprises removing the customer's transaction address or public key from at least one whitelist implemented on at least one smart contract.

Example 44 includes the qualifier computing system of any of Examples 34-43, wherein the digital asset comprises at least one of a digital video, digital music, an achievement or digital asset within a video game ecosystem, and a software program.

What is claimed is:

1. A computerized method, comprising:
   causing at least one of know-your-customer (KYC), anti-money laundering (AML), and accredited investor review to be initially performed for an owner of a transaction account;
   receiving payment of an amount of cryptocurrency from the transaction account to another account;
   sending a challenge string to a customer device to be signed by a private key of a wallet of the owner;
   receiving the challenge string with a signature from the private key of the wallet of the owner;
   validating the signature against the transaction account on a distributed ledger that is tagged or whitelisted by:
      deriving a public key corresponding to the private key of the wallet of the owner from the signature;
      hashing the public key to form a hash; and
      comparing the hash against the transaction account on the distributed ledger that is tagged or whitelisted;
   determining that the payment of the amount of cryptocurrency is received at the another account from the transaction account and the signature is successfully validated;
   causing the at least one of KYC, AML, and accredited investor review to be performed again for the owner of the transaction account;
   determining that the at least one of KYC, AML, and accredited investor review being performed again causes a status of the owner of the transaction account to change;
   adding at least one indication of the status of the owner in the distributed ledger by:
      recording at least one tag into the transaction account; and
      adding the transaction account or the public key of the owner to at least one whitelist implemented on at least one smart contract; or
   removing at least one indication of the status of the owner to the distributed ledger by:
      removing at least one tag from the transaction account; and
      removing the transaction account or the public key of the owner from at least one whitelist implemented on at least one smart contract.

2. The computerized method of claim 1, further comprising:
   receiving identity data about the owner of the transaction account; and
   receiving payment for identity services.

3. The computerized method of claim 1, further comprising:
   determining that the at least one of KYC, AML, and accredited investor review is initially performed successfully; and adding an indication of the status of the owner to the distributed ledger.

4. The computerized method of claim 1, further comprising sending an indication of a result of the at least one of KYC, AML, and accredited investor review to the owner of the transaction account.

5. The computerized method of claim 1, wherein the transaction account is a transaction address on the distributed ledger.

6. The computerized method of claim 1, further comprising adding or removing each respective tag of the at least one tag using a signature from a respective person or entity possessing a respective qualifier token associated with the respective tag.

7. A qualifier computing system, comprising:
at least one memory; and
at least one processor communicatively coupled to the at least one memory and configured to:
cause at least one of know-your-customer (KYC), anti-money laundering (AML), and accredited investor review to be initially performed for an owner of a transaction account;
receive payment of an amount of cryptocurrency from the transaction account to another account;
send a challenge string to a customer device to be signed by a private key of a wallet of the owner;
receive the challenge string with a signature from the private key of the wallet of the owner;
validate the signature against the transaction account on a distributed ledger that is tagged or whitelisted by:
deriving a public key corresponding to the private key of the wallet of the owner from the signature;
hashing the public key to form a hash; and
comparing the hash against the transaction account on the distributed ledger that is tagged or whitelisted;
determine that the payment of the amount of cryptocurrency is received at the another account from the transaction account and the signature is successfully validated;
cause the at least one of KYC, AML, and accredited investor review to be performed again for the owner of the transaction account;
determine that the at least one of KYC, AML, and accredited investor review being performed again causes a status of the owner of the transaction account to change;
add at least one indication of the status of the owner in the distributed ledger by:
recording at least one tag into the transaction account; and
adding the transaction account or the public key of the owner to at least one whitelist implemented on at least one smart contract; or
remove at least one indication of the status of the owner to the distributed ledger by:
removing at least one tag from the transaction account; and
removing the transaction account or the public key of the owner from at least one whitelist implemented on at least one smart contract.

8. The qualifier computing system of claim 7, wherein the at least one processor is further configured to:
receive identity data about the owner of the transaction account; and
receive payment for identity services.

9. The qualifier computing system of claim 7, wherein the at least one processor is further configured to add an indication of the status of the owner to the distributed ledger when the at least one of KYC, AML, and accredited investor review is initially performed successfully.

10. The qualifier computing system of claim 7, wherein the at least one processor is further configured to send an indication of a result of the at least one of KYC, AML, and accredited investor review to the owner of the transaction account.

11. The qualifier computing system of claim 7, wherein the transaction account is a transaction address on the distributed ledger.

12. The qualifier computing system of claim 7, wherein exclusive authority to add or remove each respective tag of the at least one tag is held by a respective person or entity possessing a respective qualifier token associated with the respective tag.

13. A computerized method, comprising:
causing at least one of: (1) at least one of know-your-customer (KYC), anti-money laundering (AML), and accredited investor review to be initially performed for an owner of a transaction account; or (2) a subscription or license to be provided to the owner of the transaction account;
receiving payment of an amount of cryptocurrency from the transaction account to another account;
sending a challenge string to a customer device to be signed by a private key of a wallet of the owner;
receiving the challenge string with a signature from the private key of the wallet of the owner;
validating the signature against the transaction account on a distributed ledger that is tagged or whitelisted by:
deriving a public key corresponding to the private key of the wallet of the owner from the signature;
hashing the public key to form a hash; and
comparing the hash against the transaction account on the distributed ledger that is tagged or whitelisted;
determining that the payment of the amount of cryptocurrency is received at the another account from the transaction account and the signature is successfully validated;
causing at least one of: (1) the at least one of KYC, AML, and accredited investor review to be performed again for the owner of the transaction account; or (2) the subscription or license to be renewed for the owner of the transaction account;
determining that the at least one of: (1) the at least one of KYC, AML, and accredited investor review being performed again; or (2) the subscription or license renewal causes a status of the owner of the transaction account to change;
adding at least one indication of the status of the owner in the distributed ledger by:
recording at least one tag into the transaction account; and
adding the transaction account or the public key of the owner to at least one whitelist implemented on at least one smart contract; or
removing at least one indication of the status of the owner to the distributed ledger by:
removing at least one tag from the transaction account; and
removing the transaction account or the public key of the owner from at least one whitelist implemented on at least one smart contract.

14. The computerized method of claim 13, further comprising:
   receiving identity data about the owner of the transaction account; and
   receiving payment for identity services.

15. The computerized method of claim 13, further comprising:
   determining that the at least one of: (1) the at least one of KYC, AML, and accredited investor review is initially performed successfully; or (2) the subscription or license is provided to the owner of the transaction account and
   adding an indication of the status of the owner to the distributed ledger.

16. The computerized method of claim 13, further comprising sending an indication of a result of the at least one of: (1) the at least one of KYC, AML, and accredited investor review; or (2) the subscription or license renewal to the owner of the transaction account.

17. The computerized method of claim 13, wherein the transaction account is a transaction address on the distributed ledger.

18. The computerized method of claim 13, further comprising adding or removing each respective tag of the at least one tag using a signature from a respective person or entity possessing a respective qualifier token associated with the respective tag.

* * * * *